US012194937B2

(12) United States Patent
Bartlett et al.

(10) Patent No.: US 12,194,937 B2
(45) Date of Patent: Jan. 14, 2025

(54) METHOD AND APPARATUS FOR CONTROLLING AN ACTUATABLE PROTECTION DEVICE WITH OFF-ROAD AND ROLLOVER DETECTION

(71) Applicant: ZF FRIEDRICHSHAFEN AG, Friedrichshafen (DE)

(72) Inventors: Charles A. Bartlett, Commerce Township, MI (US); Chunqi Wang, Friedrichshafen (DE); Kiran Balasubramanian, Canton, MI (US); Huahn-Fern Yeh, Novi, MI (US); Luca Zaffalon, Friedrichshafen (DE); Adriano Putetto, Friedrichshafen (DE); Maciej Rejer, Friedrichshafen (DE); Chuck Zhan, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 18 days.

(21) Appl. No.: 17/908,063

(22) PCT Filed: Mar. 12, 2020

(86) PCT No.: PCT/IB2020/052258
§ 371 (c)(1),
(2) Date: Aug. 30, 2022

(87) PCT Pub. No.: WO2021/181138
PCT Pub. Date: Sep. 16, 2021

(65) Prior Publication Data
US 2023/0116504 A1    Apr. 13, 2023

(51) Int. Cl.
*B60R 22/00*    (2006.01)
*B60R 21/01*    (2006.01)
(Continued)

(52) U.S. Cl.
CPC .......... *B60R 21/0132* (2013.01); *B60R 21/01* (2013.01); *B60R 2021/01211* (2013.01);
(Continued)

(58) Field of Classification Search
CPC ................ B60R 21/0132; B60R 21/01; B60R 2021/01211; B60R 2021/01272;
(Continued)

(56) References Cited

U.S. PATENT DOCUMENTS 6,826,468 B2 * 11/2004 Williams ............ B60R 21/0132
280/5.502
2002/0075142 A1    6/2002 Foo et al.
(Continued)

FOREIGN PATENT DOCUMENTS

EP    1219500 A2    7/2002
EP    2657089 A1    10/2013
(Continued)

OTHER PUBLICATIONS

International Search Report issued in Intl. Appln. No. PCT/IB2020/052258 mailed Dec. 9, 2020.
(Continued)

*Primary Examiner* — Adam M Alharbi
(74) *Attorney, Agent, or Firm* — ROSSI, KIMMS & McDOWELL LLP

(57) ABSTRACT

A method for controlling actuation of an actuatable restraint in response to a vehicle rollover event includes detecting whether the vehicle (12) is being driven off-road. The method also includes determining whether the vehicle (12) is undergoing a roll event (99) that would warrant actuation of the actuatable restraint (20) if the vehicle was being driven on-road. The method further includes actuating the actuatable restraint (20) in response to determining that a roll acceleration (D RATE) of the vehicle (20) indicates that
(Continued)

the roll event is continuing. A vehicle safety system (10) includes an actuatable restraint and a controller (50) configured to control actuation of the actuatable restraint according to this method.

17 Claims, 12 Drawing Sheets

(51) Int. Cl.
  *B60R 21/0132*  (2006.01)
  *B60R 21/013*  (2006.01)

(52) U.S. Cl.
  CPC ............... *B60R 2021/01272* (2013.01); *B60R 2021/01286* (2013.01); *B60R 2021/01304* (2013.01); *B60R 2021/01306* (2013.01)

(58) Field of Classification Search
  CPC  B60R 2021/01286; B60R 2021/01304; B60R 2021/01306
  See application file for complete search history.

(56) References Cited

U.S. PATENT DOCUMENTS

| | | | |
|---|---|---|---|
| 2002/0075143 A1* | 6/2002 | Foo | ....................... B60R 21/013 340/440 |
| 2002/0087235 A1 | 7/2002 | Aga et al. | |
| 2008/0262680 A1* | 10/2008 | Yeh | ..................... B60R 21/0132 701/45 |
| 2009/0105899 A1 | 4/2009 | Foo et al. | |
| 2013/0179042 A1* | 7/2013 | Katz | ................... B60R 21/0132 701/1 |
| 2015/0100208 A1 | 4/2015 | Wogel et al. | |

FOREIGN PATENT DOCUMENTS

| | | |
|---|---|---|
| WO | 2007133666 A2 | 11/2007 |
| WO | 2008123984 A1 | 10/2008 |

OTHER PUBLICATIONS

Written Opinion issued in Intl. Appln. No. PCT/IB2020/052258 mailed Dec. 9, 2020.

* cited by examiner

SOFT SOIL CLASSIFICATION (LEFT ROLL)

MID SOIL CLASSIFICATION
(LEFT ROLL)

METHOD AND APPARATUS FOR CONTROLLING AN ACTUATABLE PROTECTION DEVICE WITH OFF-ROAD AND ROLLOVER DETECTION

CROSS REFERENCES TO RELATED APPLICATIONS

This application filed under 35 U.S.C § 371 is a national phase application of International Application Serial Number PCT/IB2020/052258, filed Mar. 12, 2020, the subject matter of which are incorporated herein by reference in its entirety.

TECHNICAL FIELD

The present invention relates to a method and apparatus for controlling a vehicle actuatable occupant protection device and, in particular, to a method and apparatus for controlling the protection device in response to rollover events in both normal and off-road driving conditions.

BACKGROUND

Vehicle safety systems include a central control unit, sometimes referred to as an airbag control unit ("ACU"), that utilizes sensors, both local to the ACU and remote from the ACU, to detect the occurrence of crash events involving the vehicle and to determine whether those events warrant the activation of actuatable restraints, such as airbags and seatbelt retractors. The sensors utilized by the ACU can include accelerometers and other sensors, such as impact sensors, seatbelt buckle switches, seat pressure switches, steering angle sensors, etc. Using data from these sensors, the ACU can determine the occurrence of vehicle crash events and can perform discrimination algorithms to classify the crash event as being one of a particular type. The ACU can actuate the actuatable restraints according to the particular type of crash event.

For vehicle safety systems, it is desirable to discriminate amongst the various crash events in which a vehicle can be involved. To "discriminate" a crash event can mean to classify the crash event as being of one particular type of crash event and distinguish that crash event from other types of crash events. If the vehicle safety system can discriminate or identify the crash event as being of one particular type, the actuatable restraints can be actuated in a manner tailored to that particular type of crash event. "Crash events," as used herein, can be used to encompass various events involving the vehicle. For example, crash events can be collisions or impacts in which the vehicle collides with, impacts, or otherwise engages different types of structures. These crash events can be collisions with a deformable barrier, such as another vehicle, or collisions with a non-deformable barrier, such as a tree or utility pole. As another example, crash events can also involve events, such as rollover events, where vehicle impacts result from the rolling over of the vehicle. Rollover events can result from a vehicle sliding sideways and striking a curb, from sliding or otherwise moving off the side of the road down an embankment or ditch, or from sliding or otherwise moving off the side of the road up a ramp, such as a hill.

Vehicle safety systems can be configured or adapted to discriminate those events for which deployment of the actuatable restraints is desired ("deployment events") from those events for which deployment of the actuatable restraints is not desired ("non-deployment events"). Crash discrimination entails determining the type of event, e.g., deformable barrier, non-deformable barrier, front impact crash, rear impact crash, side impact crash, oblique crash, offset crash, rollover, etc. Crash discrimination also entails determining the severity of the crash and implementing safing functions that act as checks to ensure that the actuatable restraints are deployed in a safe manner.

From the above, it will be appreciated that it can be desirable to control the actuation and timing of the actuatable restraints in the safety system in response to the type and/or severity of the crash event in which the vehicle is involved. To determine which occupant protection devices to actuate in response to a sensed crash event, the safety system can implement a crash evaluation process to discriminate between types of crash events. If the identified crash event meets or exceeds a severity threshold, and the safing functions agree, the actuatable restraints can be actuated in a manner commensurate with the discriminated event type.

Over the years, safety standards are modified and updated to "push the envelope" when it comes to automotive safety. As a result, in keeping up with the standards, automobile manufacturers are pushed to constantly improve the safety of their products. As the standards become more rigorous, the safety systems adapt and become more complex and capable. Through the evolution of vehicle safety systems, it has been discovered that crash classification is one of the key aspects that helps determine the efficacy of the system. If the safety system can accurately and robustly identify the crash scenario as defined by a safety standard, it can take measures tailored to produce the best results for occupants involved in accidents for which the standard is designed.

While vehicle safety systems have been developed with the ability to discriminate a variety of crash events, there exists a continuing need to further classify and discriminate amongst crash events so that the vehicle safety system can take the appropriate responsive action. Among the crash events for which discrimination can be desired are rollover events.

It may be desirable to actuate safety devices, such as side airbags (curtain airbags, thorax airbags) and/or seatbelt pretensioners in response to rollover events. Rollover events can occur in a variety of scenarios. For example, a vehicle can lose control and skid sideways off the road onto the adjacent grass/soil, down an embankment, into a ditch, or up a ramp or hill. As another example, a vehicle can lose control and skid sideways into a low barrier, such as a curb. In any of these scenarios, the magnitude of the resulting rollover event may warrant actuating one or more vehicle safety devices.

Some vehicles are adapted for off-road use as a matter of utility or for recreational purposes. During off-road use, the vehicle can be prone to encountering abrupt movements, hard or abrupt starts/stops, steep angles, severe rocking in all directions, etc. Nevertheless, vehicle movements during certain off-road maneuvers and during the initial stages of a rollover event could be sensed by a vehicle safety system portion of rolling over could share resemblance, result in similar signals to the sensors and potentially lead to inadvertent actuation of safety devices. A way to further distinguish off-road non rollover events from actual rollover events is needed.

SUMMARY

According to one aspect, a vehicle safety system comprises an actuatable restraint for helping to protect a vehicle occupant, and a controller for controlling actuation of the actuatable restraint in response to a vehicle rollover event. The controller is configured to execute an off-road detection metric configured to determine whether the vehicle is being operated under normal usage or off-road usage. The controller is also configured to execute a rollover discrimination metric configured to discriminate the occurrence of a rollover event in response to a vehicle roll rate (R_RATE) having a magnitude that exceeds one or more predetermined roll rate thresholds. In response to determining that the vehicle is being operated under normal usage, the controller is also configured to execute a normal rollover deployment algorithm to detect a vehicle rollover in response to the rollover discrimination metric discriminating the rollover event. In response to determining that the vehicle is being operated under off-road usage, the controller is also configured to execute an off-road rollover deployment algorithm to detect a vehicle rollover in response to the rollover discrimination metric discriminating the rollover event.

According to another aspect, alone or in combination with any other aspect, the off-road detection metric can be configured to evaluate a vehicle roll angle (R_ANGLE) over time to determine whether the vehicle is being operated under normal usage or off-road usage.

According to another aspect, alone or in combination with any other aspect, the off-road detection metric can be configured to determine off-road usage in response to the vehicle roll angle crossing both an upper roll threshold indicative of positive roll angle and a lower roll threshold indicative of negative roll angle without the rollover discrimination metric entering a reset box.

According to another aspect, alone or in combination with any other aspect, the off-road rollover deployment algorithm can be configured to detect a vehicle rollover in response to a normal safing function being ON and/or a specific rollover classification algorithm classifying the rollover event, and the rollover discrimination metric crossing an off-road rollover threshold.

According to another aspect, alone or in combination with any other aspect, the off-road rollover deployment algorithm can be configured to detect a vehicle rollover event in response to all of the following conditions being satisfied: the rollover discrimination metric crosses a rollover threshold that discriminates a specific type of rollover event; a rollover classification algorithm classifies a rollover event that matches the specific type of rollover discriminated by the rollover discrimination metric; and a roll acceleration (D_RATE) metric is maintained above a predetermined D_RATE threshold.

According to another aspect, alone or in combination with any other aspect, the specific type of rollover event can be one of a ramp rollover event, a ditch rollover event, a soft soil rollover event, a mid-soil rollover event, and a hard soil/curb rollover event.

According to another aspect, alone or in combination with any other aspect, the rollover classification algorithm can be configured to reset the classification in response to the rollover discrimination metric crossing a reset threshold or a vehicle roll angle (R_ANGLE) being equal to zero.

According to another aspect, alone or in combination with any other aspect, the rollover classification algorithm can be configured to classify the rollover event in response to:

A lateral Y-axis acceleration (AMA_Y) metric that plots AMA_Y versus roll angle (R_ANGLE) crossing a predetermined threshold.

A vertical Z-axis acceleration (AMA_Z) metric that plots AMA_Z versus roll angle (R_ANGLE) crossing a predetermined threshold.

A roll rate (R_RATE) metric that plots R_RATE versus roll angle (R_ANGLE) crossing a predetermined threshold.

A roll acceleration (D_RATE) metric that plots D_RATE versus roll angle (R_ANGLE) crossing a predetermined threshold.

According to another aspect, alone or in combination with any other aspect, the D_RATE metric can include predetermined thresholds for identifying soft soil rollover events, mid-soil rollover events, and hard soil/curb rollover events.

According to another aspect, alone or in combination with any other aspect, the normal rollover deployment algorithm can be configured to detect a vehicle rollover in response to the rollover discrimination metric discriminating a rollover event and a specific rollover classification algorithm classifying the rollover event.

According to another aspect, alone or in combination with any other aspect, the normal rollover deployment can be configured to execute at least one of the following:

Determine the occurrence of a normal rollover event in response to the rollover discrimination metric crossing a normal threshold and a normal safing function being ON.

Determine the occurrence of a ramp rollover event in response to the rollover discrimination metric crossing a ramp threshold and a ramp classification algorithm being ON.

Determine the occurrence of a ditch rollover event in response to the rollover discrimination metric crossing a ditch threshold and a ditch classification algorithm being ON.

Determine the occurrence of a hard soil/curb rollover event in response to the rollover discrimination metric crossing a hard soil/curb threshold and a hard soil/curb classification algorithm being ON.

Determine the occurrence of a mid-soil rollover event in response to the rollover discrimination metric crossing a mid-soil threshold and a mid-soil classification algorithm being ON.

Determine the occurrence of a soft soil rollover event in response to the rollover discrimination metric crossing a soft soil threshold and a soft soil classification algorithm being ON.

According to another aspect, alone or in combination with any other aspect, the vehicle safety system can also include:

An accelerometer for sensing vehicle lateral Y-axis acceleration and providing a signal indicative of sensed vehicle lateral Y-axis acceleration (AMA_Y).

An accelerometer for sensing vehicle vertical Z-axis acceleration and providing a signal indicative of sensed vehicle vertical Z-axis acceleration (AMA_Z).

A roll sensor for sensing vehicle roll values and providing a signal indicative of sensed vehicle roll values.

The controller can be configured to execute the off-road detection metric, rollover discrimination metric, normal rollover deployment algorithm, and off-road rollover deployment algorithm using the signals provided by the accelerometers, and the roll rate sensor.

According to another aspect, alone or in combination with any other aspect, the actuatable restraints can include at least one of seatbelt anchor pretensioners, seatbelt retractor pretensioners, curtain airbags, thorax airbags, and side airbags.

According to another aspect, a method for controlling actuation of an actuatable restraint in response to a vehicle rollover event includes detecting whether the vehicle is being driven off-road. The method also includes determining whether the vehicle is undergoing a roll event that would warrant actuation of the actuatable restraint if the vehicle was being driven on-road. The method further includes actuating the actuatable restraint in response to determining that a roll acceleration (D_RATE) of the vehicle indicates that the roll event is continuing.

According to another aspect, alone or in combination with any other aspect, detecting whether the vehicle is being driven off-road can include evaluating a vehicle roll angle (R_ANGLE) over time, and determining that the vehicle is being driven off-road in response to the R_ANGLE crossing both an upper roll threshold indicative of positive roll angle and a lower roll threshold indicative of negative roll angle without a rollover discrimination metric entering a reset box.

According to another aspect, alone or in combination with any other aspect, determining whether the vehicle is undergoing a roll event can include evaluating a rollover discrimination metric that plots roll angle (R_ANGLE) versus roll rate (R_RATE) to determine whether the rollover discrimination metric crosses a rollover threshold.

According to another aspect, alone or in combination with any other aspect, determining whether the vehicle is undergoing a roll event can also include evaluating a rollover classification algorithm to determine the occurrence of a specific type of rollover event.

According to another aspect, alone or in combination with any other aspect, evaluating the rollover classification algorithm can include:
  Evaluating a lateral Y-axis acceleration (AMA_Y) metric that plots AMA_Y versus roll angle (R_ANGLE) crossing a predetermined threshold.
  Evaluating a vertical Z-axis acceleration (AMA_Z) metric that plots AMA_Z versus roll angle (R_ANGLE) crossing a predetermined threshold.
  Evaluating a roll rate (R_RATE) metric that plots R_RATE versus roll angle (R_ANGLE) crossing a predetermined threshold.
  Evaluating a roll acceleration (D_RATE) metric that plots D_RATE versus roll angle (R_ANGLE) crossing a predetermined threshold.

According to another aspect, alone or in combination with any other aspect, the specific type of rollover event can be one of a ramp rollover event, a ditch rollover event, a soft soil rollover event, a mid-soil rollover event, and a hard soil/curb rollover event.

According to another aspect, alone or in combination with any other aspect, a vehicle safety system can include an actuatable restraint and a controller configured to control actuation of the actuatable restraint according to the method (s) described above.

DRAWINGS

The foregoing and other features and advantages of the invention will become apparent to one skilled in the art upon consideration of the following description of the invention and the accompanying drawings in which.

DESCRIPTION

The invention relates to a vehicle safety system that implements a rollover discrimination algorithm that can discriminate between and classify rollover events. The rollover discrimination algorithm also detects off-road uses of the vehicle and adjusts or switches certain aspects of the rollover discrimination in response to the detected off-road use.

Because the invention is related to the discrimination of rollover events, the vehicle safety system is shown and described herein as including the components and implementing the algorithms necessary to perform these particular discrimination functions. Those skilled in the art will appreciate that the vehicle safety system can include components in addition to those shown and described herein and can perform discrimination functions in addition to those shown and described herein.

Figure 1:
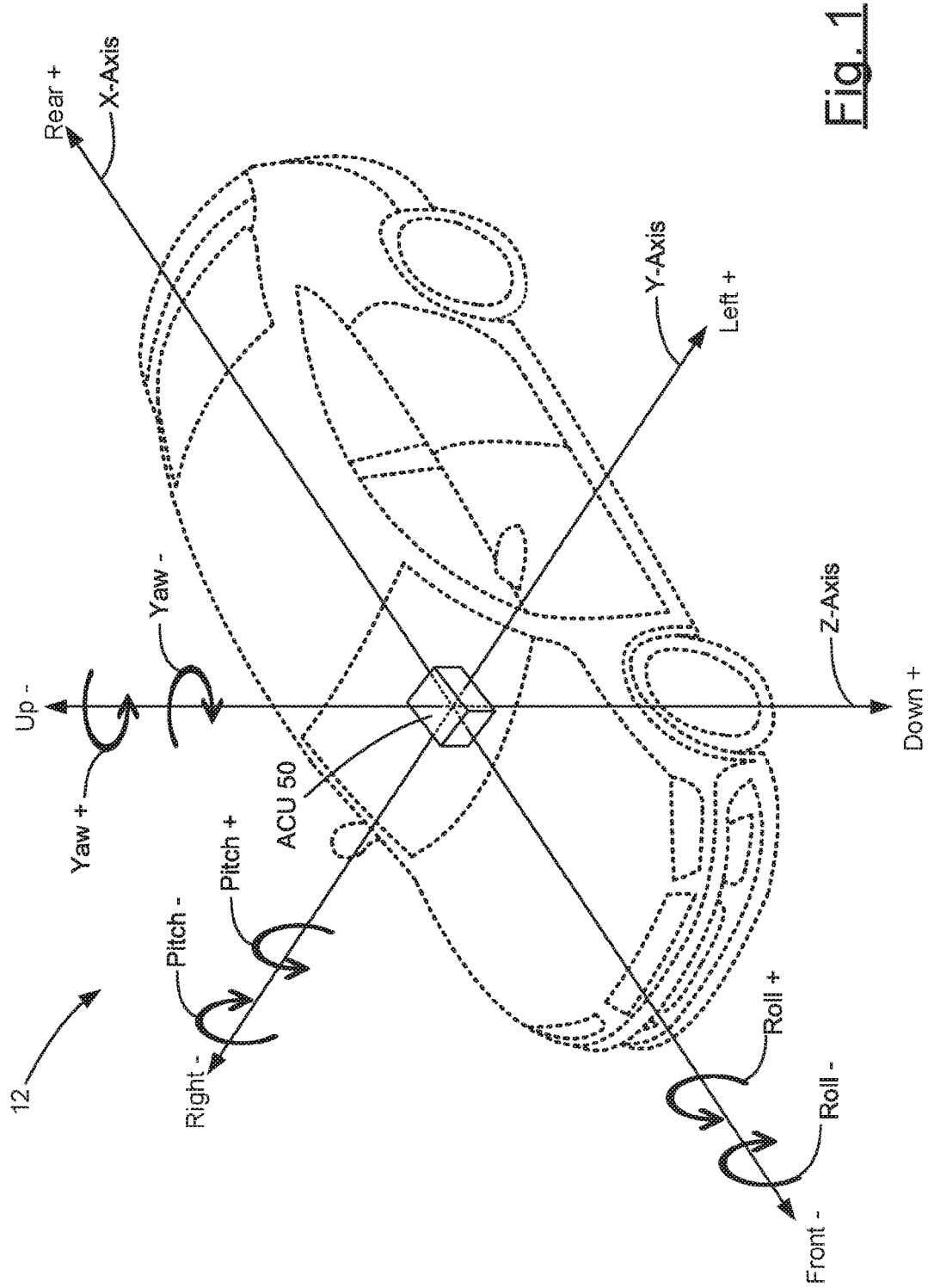
FIG. 1 is a schematic illustration of a vehicle and the signals obtained from the sensor architecture deployed therein.

Referring to FIG. 1, according to one example configuration, a vehicle 12 includes a vehicle safety system 10 that includes a central control unit, referred to herein as an airbag control unit (ACU) 50. The ACU 50 is operative to actuate one or more actuatable restraints 20, such as left/right seatbelt pretensioners (anchor and/or retractor), left/right curtain airbags, left/right thorax airbags, and left/right side airbags. The ACU 50 can also be operative to control actuation of other protection devices, such as frontal airbags and knee airbags.

The ACU 50 includes one or more sensors that are operative to provide signals indicative of vehicle linear and/or angular accelerations and/or rates of movement in different directions and with respect to different vehicle axes. The sensors can be mounted locally in or on the ACU 50 itself or can be remote from the ACU and interconnected, e.g., via wire, to the ACU. These vehicle axes include an X-axis, which extends longitudinally in the vehicle in the direction of forward/rearward vehicle travel. A vehicle Y-axis extends laterally in the vehicle, perpendicular to the X-axis. A vehicle Z-axis extends vertically in the vehicle, perpendicular to both the X-axis and the Y-axis.

The X, Y, and Z axes are shown in FIG. 1 as intersecting at the ACU 50. This is because the ACU 50 can include sensors for measuring movement, i.e., acceleration, of the vehicle 12 with respect to the X, Y, and Z axes. These movements are identified in FIG. 1 with signage (+/−) indicating the sign, positive or negative, that the safety system 10 assigns the motion along the axes. The ACU 50 can also include sensors for sensing rotation about the X-axis, i.e., pitch, about the Y-axis, i.e., roll, and about the Z-axis, i.e., yaw. The vehicle safety system 10 can utilize these accelerations and/or rotations in different combinations to detect certain vehicle conditions.

As shown in FIG. 1, the vehicle safety system 10 can be configured to interpret motions along the X-axis as positive front-to-rear (acceleration) and negative rear-to-front (deceleration). Motions along the Y-axis can be interpreted as positive right-to-left and negative left-to-right. Motions along the Z-axis can be interpreted as positive in the downward direction and negative in the upward direction. The vehicle safety system 10 can also be configured to interpret vehicle rotational motions about the X-axis, i.e., roll, can be positive for left roll and negative for right roll. Vehicle rotational motions about the Y-axis, i.e., pitch, can be positive for forward/downward pitch and negative for rearward/upward pitch. Vehicle rotational motions about the Z-axis, i.e., yaw, can be positive for left yaw (as viewed from the forward-facing perspective) and negative for right yaw.

Figure 2:
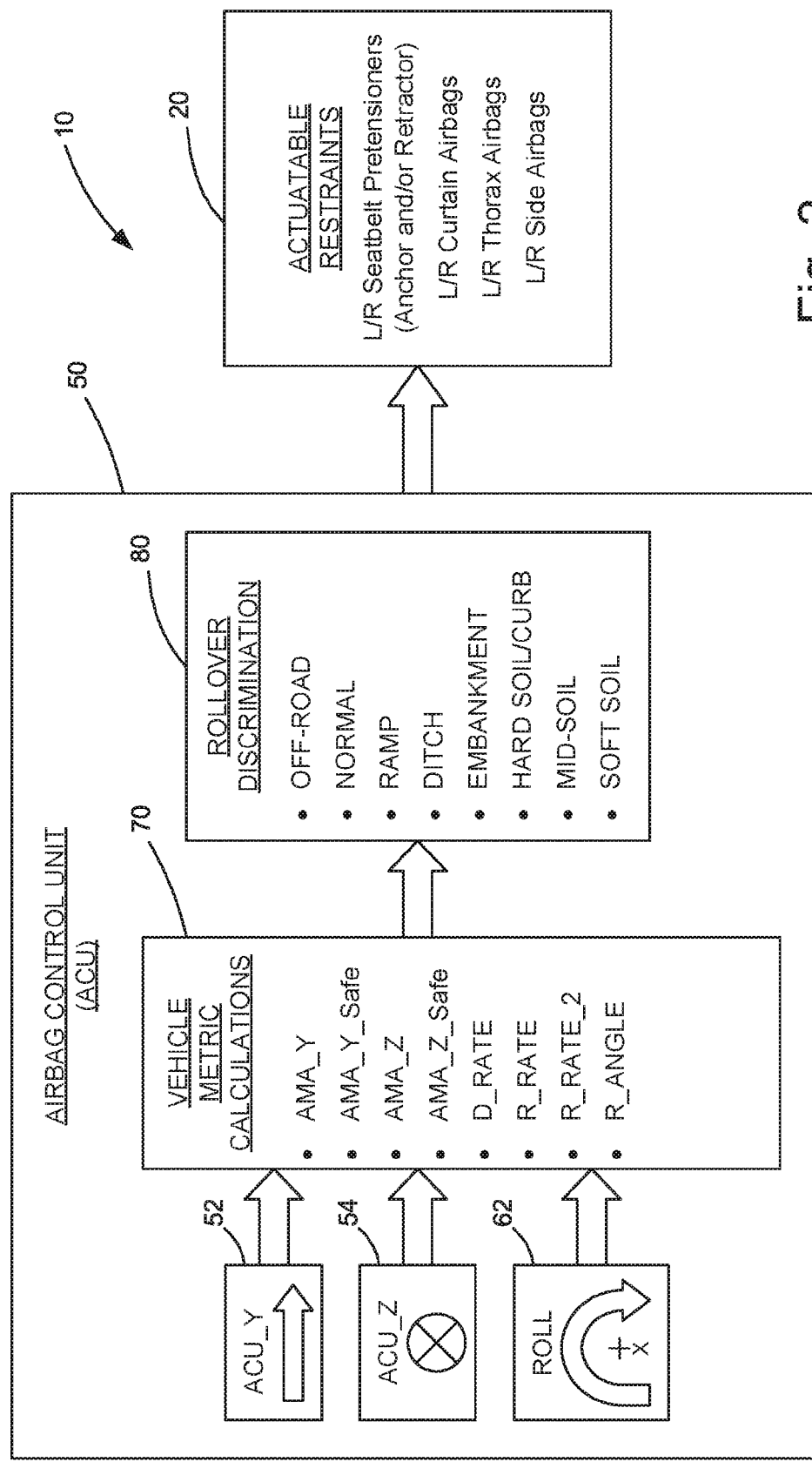
FIG. 2 is a block diagram illustrating a vehicle safety system.

Referring to FIG. 2, for purposes of the portion of the vehicle safety system 10 described herein, the ACU 50 utilizes an accelerometer 52 for sensing vehicle lateral (Y-axis) acceleration (ACU_Y), an accelerometer 54 for sensing vehicle vertical (Z-axis) acceleration (ACU_Z), and a roll rate sensor 62 for sensing vehicle roll rate values (ROLL), i.e., roll rate about the vehicle X-axis. While the vehicle safety system 10 can also include additional accelerometers and/or sensors other vehicle motions, such as X-axis accelerations, pitch, and yaw, those values are not implemented in the algorithms disclosed herein and therefore are not shown in FIG. 2.

It can be desirable to position the sensors on or near the respective axes along or about which they sense vehicle motion. Since the sensors can be mounted locally on the ACU 50, it can be desirable to mount the ACU at or near the vehicle center of mass, through which the vehicle X, Y, and Z axes pass. The position of the ACU 50 at or near the vehicle center of mass, however, is not critical, and the ACU 50 could be positioned elsewhere in the vehicle.

Hardware and software configurations for ACUs implemented in vehicle safety systems are known in the art. Therefore, a detailed description of the hardware configuration of the ACU 50 is not necessary for one having ordinary skill in the art to understand and appreciate the vehicle safety system 10. The ACU 50 of FIG. 1 includes a central processing unit (CPU), such as a microcomputer, that is configured to receive the signals ACU_Y, ACU_Z, ROLL from their respective sensors, to perform vehicle metric calculations 70 on those signals, and to perform rollover discrimination algorithms 80 utilizing the calculated metrics.

The vehicle metrics resulting from the calculations 70 include:

Vehicle lateral Y-axis acceleration moving average (AMA_Y).
Vehicle vertical Z-axis acceleration moving average (AMA_Z).
Vehicle roll difference rate, i.e., roll acceleration, (D_RATE).
Vehicle roll rate (R_RATE).
Vehicle roll rate 2 (R_RATE_2).
Vehicle roll angle (R_ANGLE).

The rollover discrimination algorithms 80 can include discrimination algorithms for detecting a number of different rollover events. These include:

Off-Road rollovers.
Normal rollovers.
Ramp rollovers.
Ditch/embankment rollovers.
Hard soil/curb rollovers.
Mid-soil rollovers.
Soft soil rollovers.

The rollover events detected by the vehicle safety system 10 can vary, depending on factors, such as manufacturer requirements and/or the industry standards under which the vehicle is produced.

Figure 3:
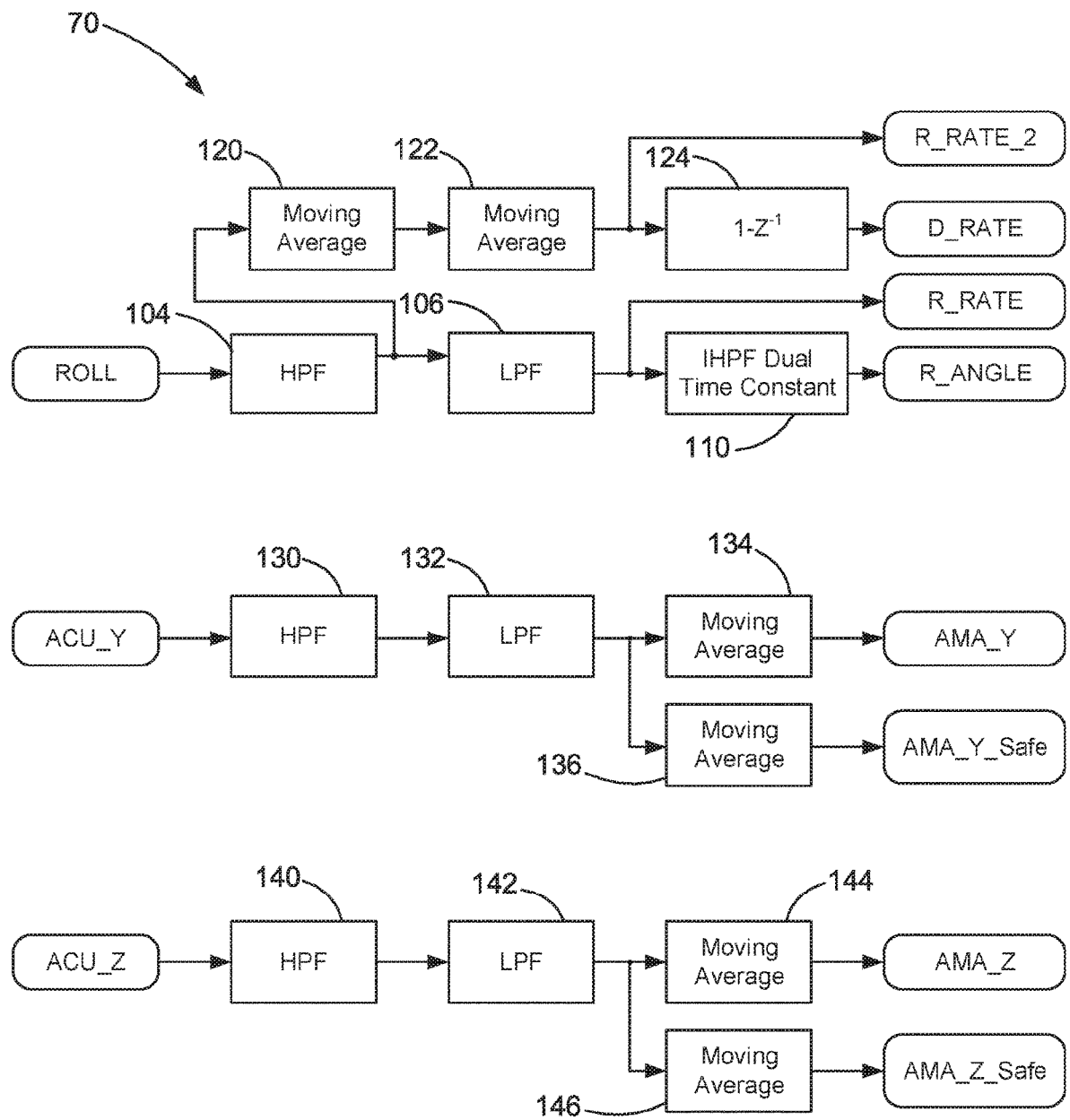
FIG. 3 is a block diagram illustrating metric calculations implemented in the vehicle safety system.

FIG. 3 illustrates the vehicle metric calculations 70 performed by the ACU 50. The elements of the vehicle metric calculations 70 shown in FIG. 2, are referred to herein as "functions" performed internally by the ACU 50.

Roll Rate Metrics

The ACU 50 employs signal conditioning that includes analog to digital conversion (ADC) for converting ROLL, ACU_Y and ACU_Z signals from the various accelerometers to digital signals. The ACU can also employ rail checking and bias adjustments. As shown in FIG. 3, the digitized and biased roll rate ROLL is passed to a high-pass filter (HPF) function 104 that, for example, can be selected to have a time constant which results in resetting the filter function after a predetermined time period, e.g., T=8 seconds. The high-pass filtered roll rate ROLL produced at HPF function 104 is passed to low-pass filter (LPF) function 106 that produces the roll rate metric R_RATE, which has a value indicative of vehicle roll rate (i.e., angular velocity), that is implemented in the rollover discrimination algorithms 80 (see, FIG. 2). R_RATE is passed to integrating high-pass filter (IHPF) function 110, which includes an integrator function and a dual time constant high-pass filter function. The IHPF function 110 integrates the R_RATE signal to produce a value indicative of a determined relative roll angle of the vehicle. The IHPF function 110 also performs high-pass filtering of the R_RATE signal. The IHPF function 110 produces the metric R_ANGLE, which is implemented in the rollover discrimination algorithms 80 (see, FIG. 2).

R_ANGLE is indicative of a normalized roll angle of the vehicle, which is a measure of relative angular rotation of the vehicle in response to a sensed roll rate. IHPF function 110 can reset the R_ANGLE based on a time constant for the high-pass filter function so that R_ANGLE provides an indication of angular rotation during the occurrence of a detected roll rate. R_ANGLE therefore may not indicate the actual angular orientation of the vehicle relative to the ground. In this way, the determination of a vehicle rollover condition need not depend on a determination of an initial angular orientation of the vehicle relative to the ground or road.

The high-pass filtered roll rate ROLL produced at HPF function 104 is also passed to moving average function 120 and then to moving average function 122. Each moving average function 120, 122 can, for example, be tunable to select the number of samples, e.g., 1-32 samples. The moving average functions 120, 122 smooth the variations in the roll rate, producing the metric R_RATE_2, which is implemented in the rollover discrimination algorithms 80 (see, FIG. 2).

R_RATE_2 provided to difference function 124 where the difference between the current sample and the previous sample are compared. This produces differenced roll rate metric D_RATE, which is indicative of a rate of change, i.e., acceleration, of the roll rate. This roll acceleration D_RATE is the angular acceleration of the vehicle about the vehicle X-axis. The roll acceleration D_RATE is implemented in the rollover discrimination algorithms 80 (see, FIG. 2).

Lateral Acceleration Metrics

As shown in FIG. 3, the digitized and biased lateral acceleration ACU_Y is passed to high-pass filter (HPF) function 130 that, for example, can be selected to have a time constant which results in resetting the filter function after a predetermined time period, e.g., T=8 seconds. The high-pass filtered lateral acceleration ACU_Y produced at HPF function 130 is passed to low-pass filter (LPF) function 132. The low-pass filtered lateral acceleration ACU_Y value produced at LPF function 132 is passed to moving average blocks 134 and 136, which produce the lateral acceleration metrics ACU_Y_AMA and ACU_Y_AMA_SAFE metrics, respectively. The number of samples include in each of the moving average functions 134, 136 can be tuned within a predetermined range, such as 1-32 samples. ACU_Y_AMA and ACU_Y_AMA_SAFE are lateral acceleration moving average values that are implemented in the rollover discrimination algorithms 80 (see, FIG. 2).

Vertical Acceleration Metrics

As shown in FIG. 3, the digitized and biased vertical acceleration ACU_Z is passed to high-pass filter (HPF) function 140 that, for example, can be selected to have a time constant which results in resetting the filter function after a predetermined time period, e.g., T=8 seconds. The high-pass filtered vertical acceleration ACU_Z produced at HPF function 140 is passed to low-pass filter (LPF) function 142. The low-pass filtered vertical acceleration ACU_Z value produced at LPF function 142 is passed to moving average blocks 144 and 146, which produce the vertical acceleration metrics ACU_Z_AMA and ACU_Z_AMA_SAFE metrics, respectively. The number of samples include in each of the moving average functions 144, 136 can be tuned within a predetermined range, such as 1-32 samples. ACU_Z_AMA and ACU_Z_AMA_SAFE are vertical acceleration moving average values that are implemented in the rollover discrimination algorithms 80 (see, FIG. 2).

Deployment Algorithm

Figure 4:
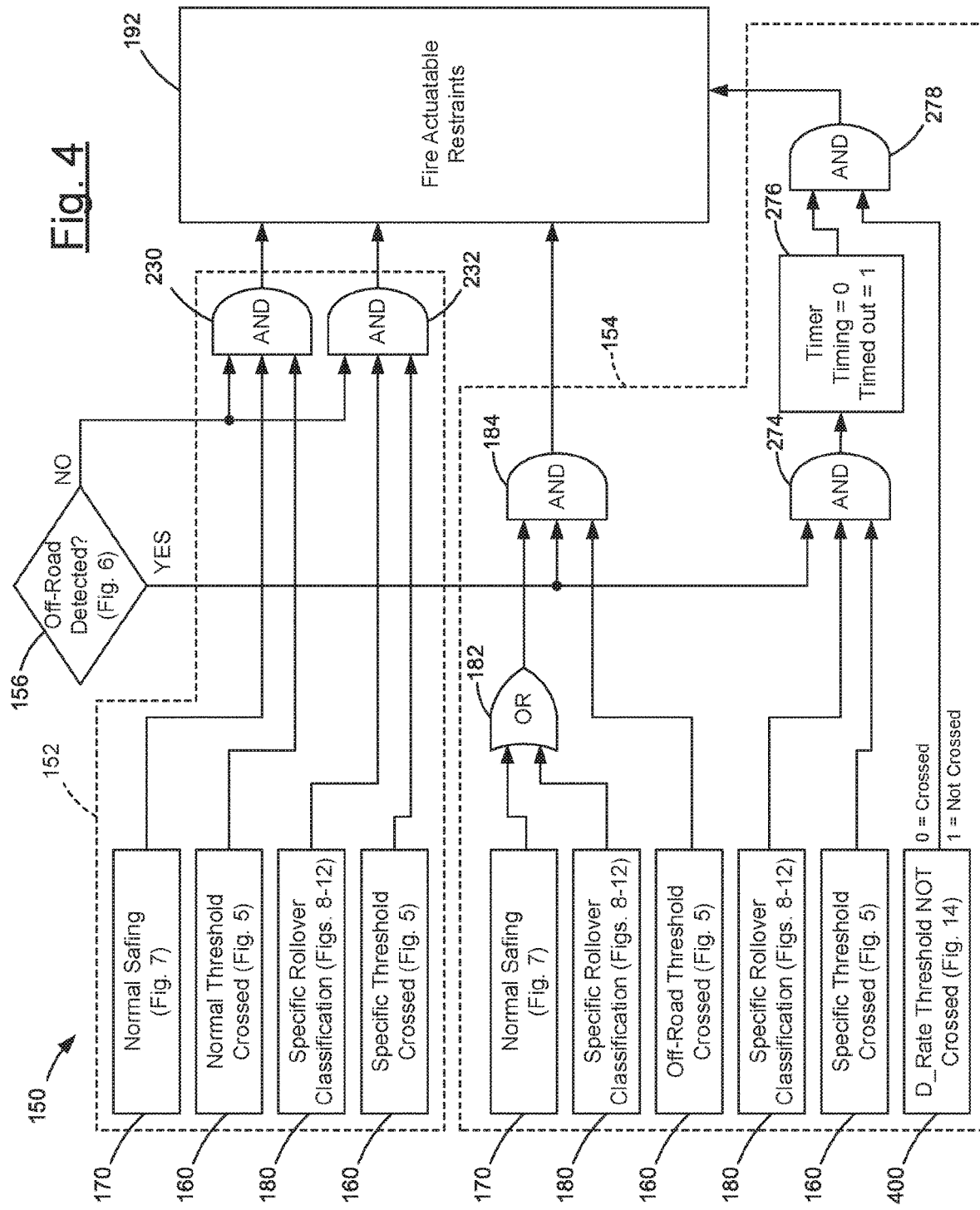
FIG. 4 is a logic diagram illustrating a deployment algorithm, implemented in the vehicle safety system, for detecting a rollover event and deploying safety devices in response to detecting the rollover event.

FIG. 4 illustrates a rollover deployment algorithm 150 implemented by the vehicle safety system 10. In the example configuration illustrated herein, the rollover deployment algorithm 150 is implemented in the ACU 50. The rollover deployment algorithm 150 determines when to actuate or "fire" the actuatable restraints 20 in response to a detected rollover event. The rollover deployment algorithm 150 advantageously implements off-road vehicle use detection, which is used to tailor the response of the vehicle safety system 10 to various instances of detected rollover events, depending on whether the vehicle 12 is being used in an off-road manner. As such, the rollover deployment algorithm 150 implements a normal rollover deployment algorithm 152 and an off-road rollover deployment algorithm 154. As will be explained below, the rollover deployment algorithm 150 makes use of the roll rate (R_RATE) to implement these off-road enhancements.

Roll Discrimination

Figure 5:
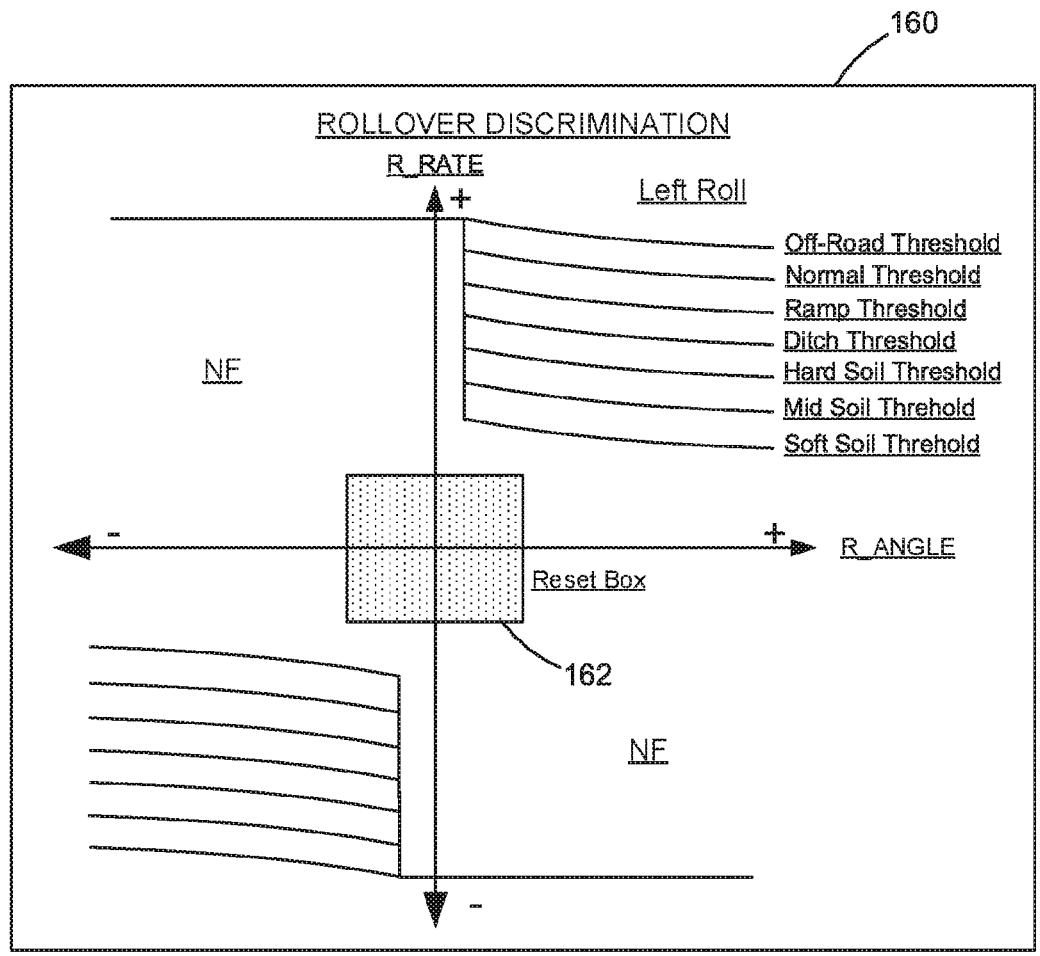
FIG. 5 is a diagram illustrating discrimination metrics, including thresholds for determining the occurrence of a rollover event, implemented in the vehicle safety system.

The rollover deployment algorithm 150 implements rollover discrimination metrics 160, which are illustrated in FIG. 5. As shown in FIG. 5, the rollover discrimination metrics 160 evaluate roll rate (R_RATE) vs. roll angle (R_ANGLE) to determine whether rollover thresholds are met. As shown in FIG. 5, the rollover discrimination metrics 160 implement the following rollover thresholds:
Off-Road rollover threshold.
Normal rollover threshold.
Ramp rollover threshold.
Ditch rollover threshold.
Hard soil rollover threshold.
Mid-soil rollover threshold
Soft soil rollover threshold.

The rollover discrimination metrics 160 could, however, implement additional thresholds, a subset of these thresholds, or a combination thereof. Once the normal threshold is crossed, it is latched until the R_RATE is equal to zero or the metric is inside the reset box 162 for a configurable period of time. All other thresholds are latched until the R_ANGLE is equal to zero or the metric is inside the reset box 162 for a configurable period of time.

The rollover discrimination algorithm 160 implements the ability to discriminate amongst various types of rollover events, which allows for the tailoring of the thresholds that trigger deployment of the actuatable restraints 20. The threshold determination of FIG. 5 illustrates left roll (i.e., roll toward the driver side) as being indicated by R_RATE and R_ANGLE values in the positive direction. Right roll (i.e., roll toward the passenger side) is also shown as being indicated by values for R_RATE and R_ANGLE in the opposite, i.e., negative direction.

As shown in FIG. 5, a soft soil rollover classification has the lowest threshold for triggering deployment of the actuatable restraints. A mid soil rollover classification has the next lowest threshold for triggering actuatable restraint deployment, followed by hard soil, ditch, ramp, normal, and off-road. Although the thresholds are shown in a particular order of magnitude in FIG. 4, it should be understood that the magnitudes associated with the thresholds can vary. Additionally, depending on vehicle platform variability and manufacturer requirements, the order or relative magnitude of the thresholds can also vary. For example, the hard soil threshold can be lower than the soft soil, etc. Notwithstanding this, the off-road threshold is the highest threshold.

Off-Road Detection

Figure 6:
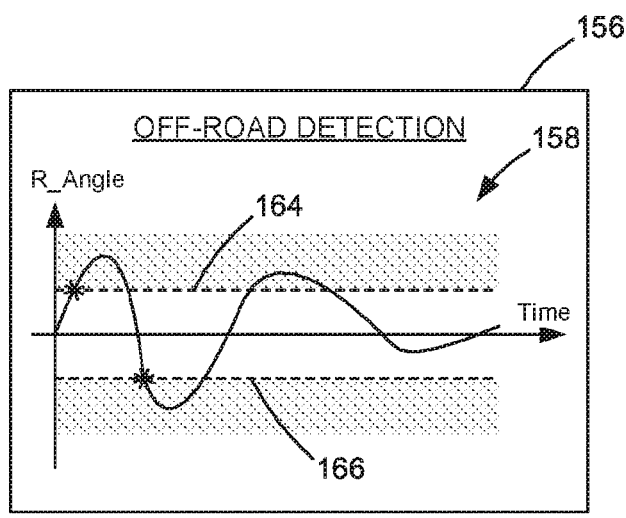
FIG. 6 is a diagram illustrating off-road detection metrics implemented in the vehicle safety system.

The rollover deployment algorithm 150 also implements an off-road detection function 156 where a determination is made as to whether the vehicle 12 is being used in an off-road manner. The off-road detection function 156 is illustrated in FIG. 6. As shown in FIG. 6, the off-road detection function 156 implements a metric 158 that monitors the roll angle (R_ANGLE) over time to determine whether the vehicle 12 is being used off-road. An off-road use condition is detected in response to the metric 158 crossing both an upper detection threshold 164 (positive roll angle) and a lower detection threshold 166 (negative roll angle). The off-road detection function 156 latches the off-road use detection until the rollover discrimination metrics 160 (R_RATE vs. R_ANGLE) enter the reset box 162 (see, FIG. 5) and stays in the reset box 162 for a configurable period of time. Crossing both thresholds without being reset indicates the off-road use due to the back-and-forth roll, i.e., rocking, which is common to off-road vehicle use.

Safing

Figure 7:
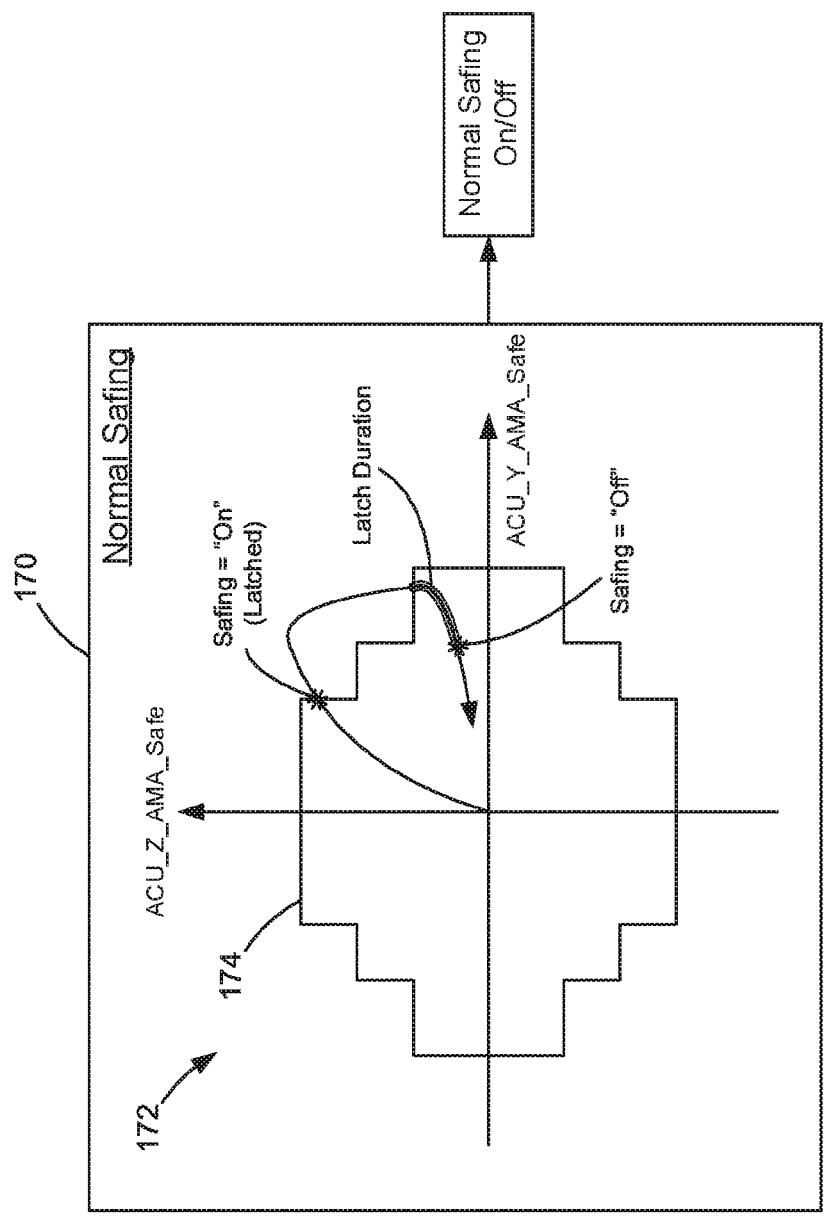
FIG. 7 is a diagram illustrating safing metrics implemented in the vehicle safety system.

The rollover deployment algorithm 100 also implements a safing function 170 that is implemented as a check for determining whether to fire the actuatable restraints 20. The safing function 170 is illustrated in FIG. 7. As shown in FIG. 7, the safing function 170 implements a metric 172 that compares the lateral acceleration metric ACU_Y_AMA_Safe and the vertical acceleration metric ACU_Z_AMA Safe. The safing function 170 is OFF (Boolean 0) when the metric 172 is within the safing region 174, and latches ON (Boolean 1) when the metric exits the safing region. The safing function 170 can implement latching such that the safing function remains ON after the metric re-enters the safing region 174. The duration of the latching can be a tunable parameter of the safing function. As a result, as shown in the example metric of FIG. 7, the safing function 170 switches to ON when the metric initially leaves the safing region 174 and remains ON while the metric is outside the safing region and for the latch duration (highlighted in FIG. 7) once the metric re-enters the safing region 174.

Deployment Algorithm

Figure 8:
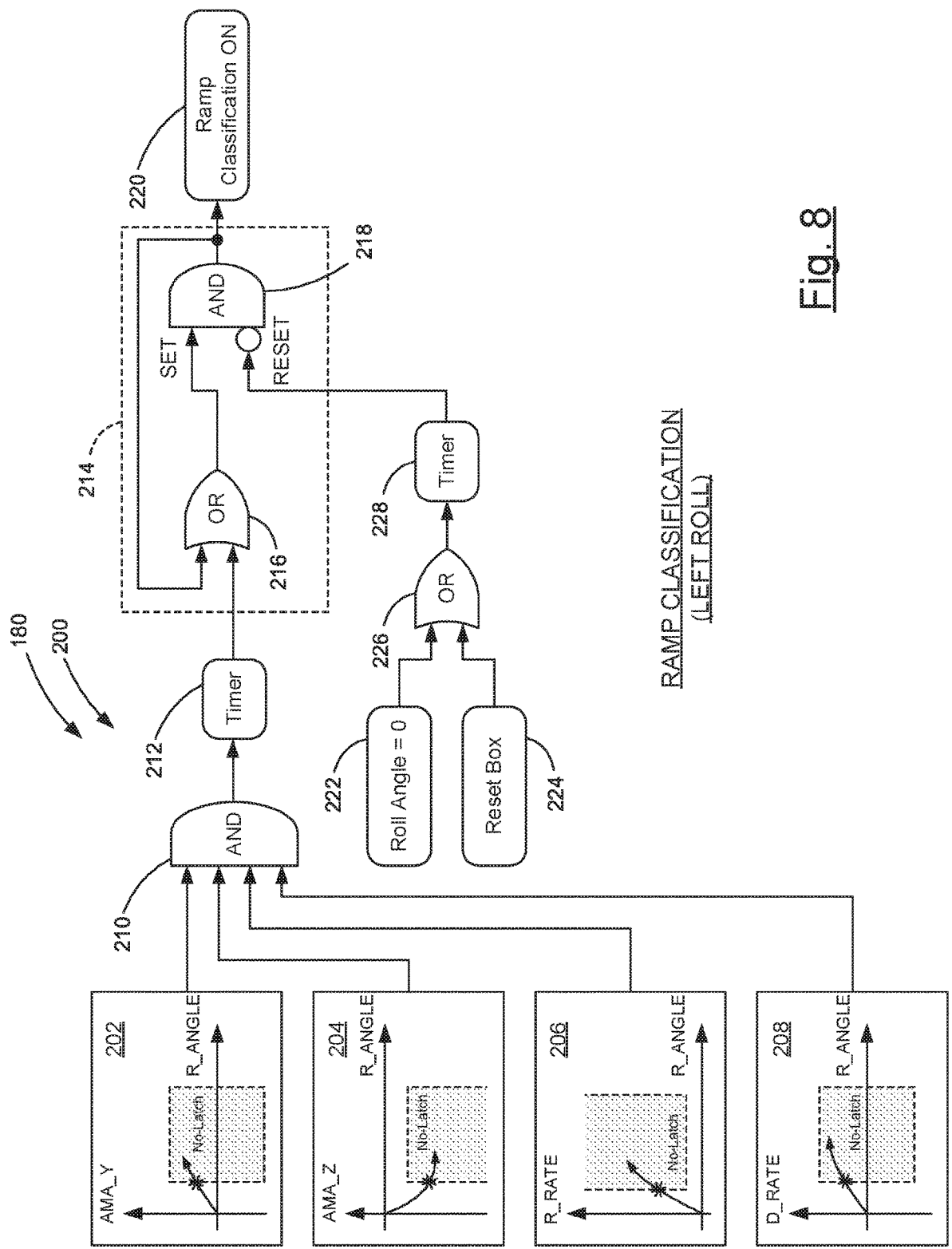
FIG. 8 is a schematic block diagram illustrating classification metrics for a ramp rollover event, implemented in the vehicle safety system.
Figure 9:
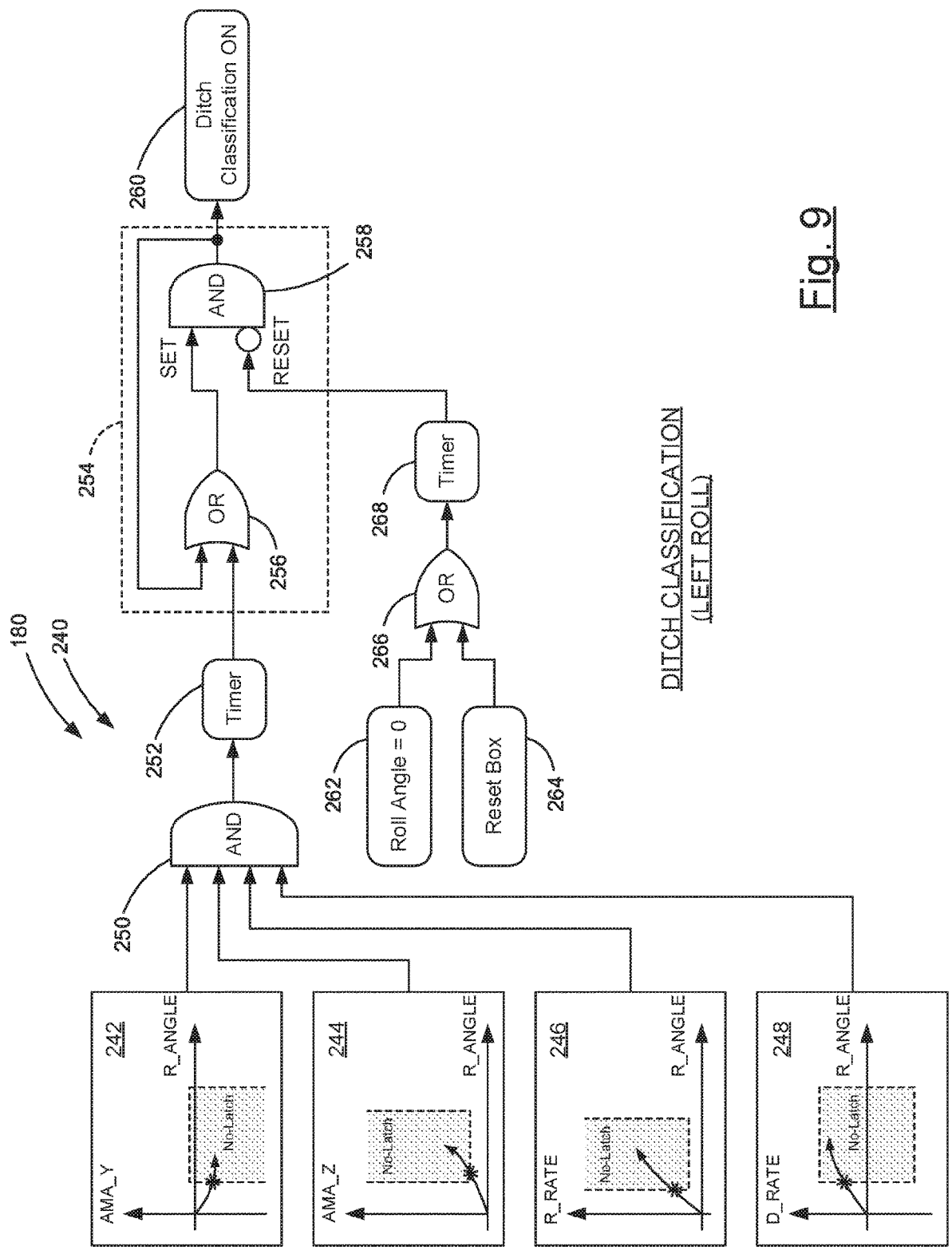
FIG. 9 is a schematic block diagram illustrating classification metrics for a ditch rollover event, implemented in the vehicle safety system.
Figure 10:
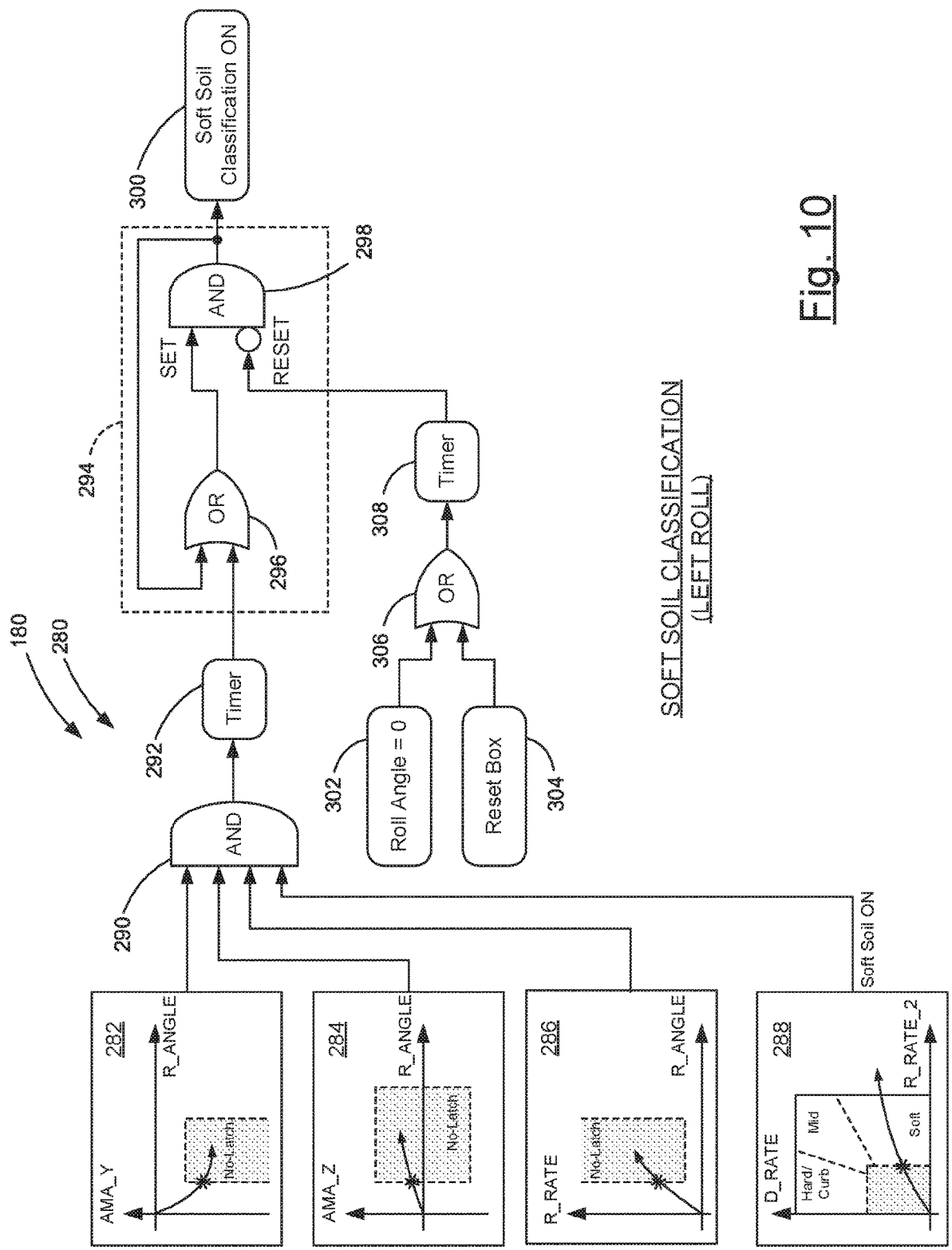
FIG. 10 is a schematic block diagram illustrating classification metrics for a soft soil rollover event, implemented in the vehicle safety system.
Figure 11:
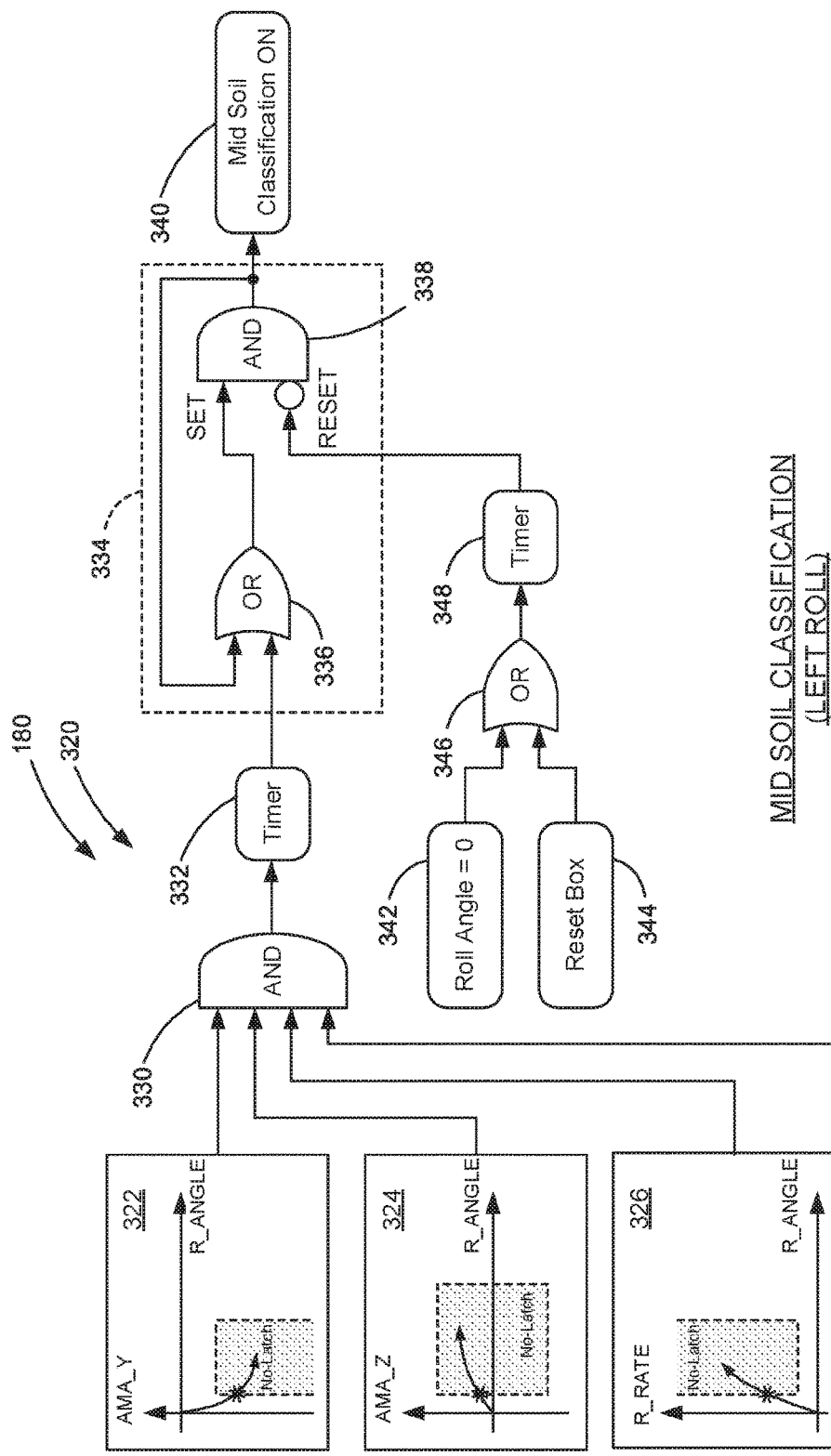
FIG. 11 is a schematic block diagram illustrating classification metrics for a mid-soil rollover event, implemented in the vehicle safety system.
Figure 12:
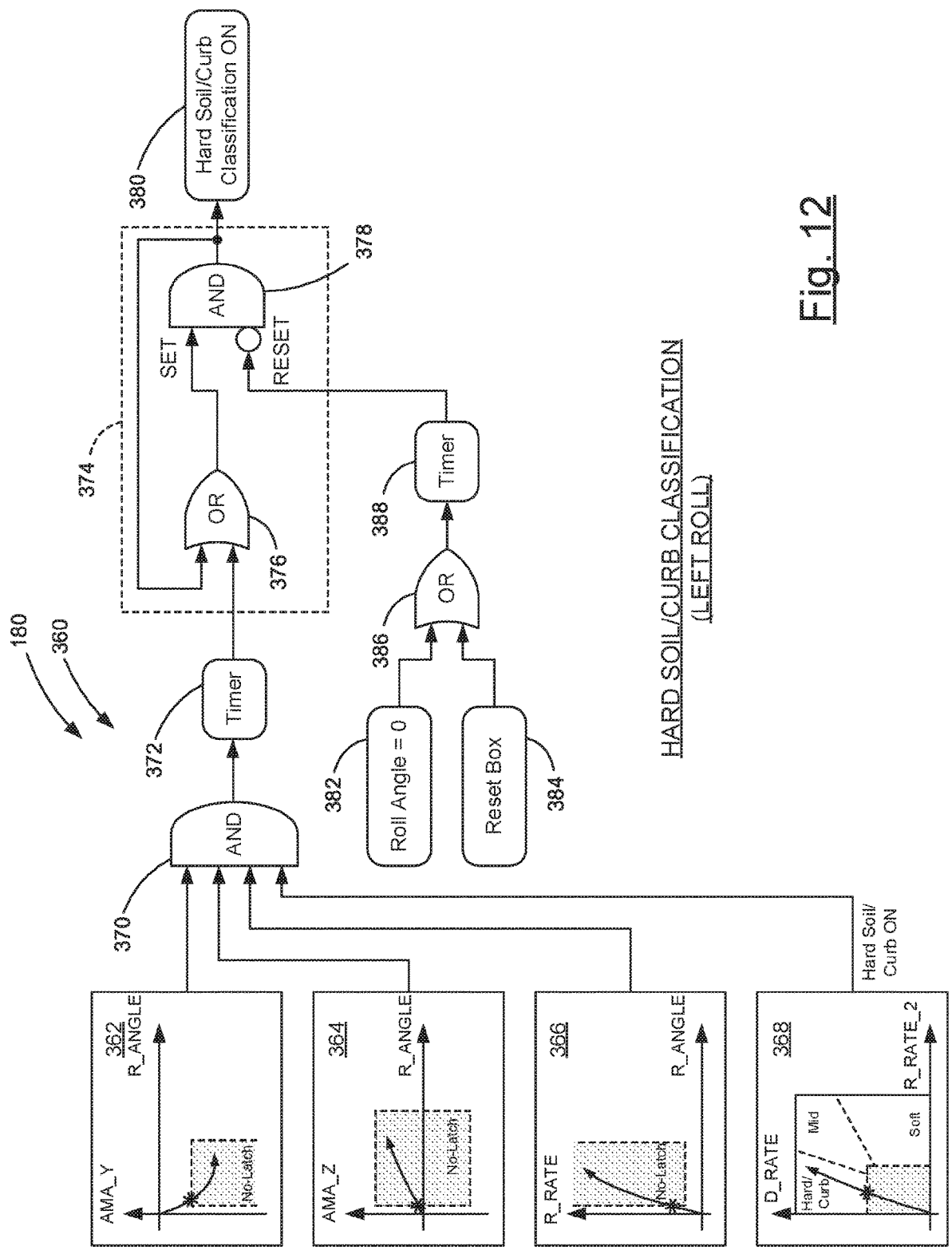
FIG. 12 is a schematic block diagram illustrating classification metrics for a hard soil/curb rollover event, implemented in the vehicle safety system.

FIGS. 8-12 illustrate specific rollover classification determination algorithms 180 implemented by the vehicle safety system 10. In the example configuration illustrated herein, the specific rollover classification determination algorithms 180 are implemented in the ACU 50. The specific rollover classification determination algorithms 180 utilize multiple vehicle metrics to classify specific rollover events as follows:
Ramp Rollover Classification Algorithm (FIG. 8).
Ditch Rollover Classification Algorithm (FIG. 9).
Soft Soil Rollover Classification Algorithm (FIG. 10).
Mid Soil Rollover Classification Algorithm (FIG. 11).
Curb Rollover Classification Algorithm (FIG. 12).

Ramp Rollover Classification Algorithm

FIG. 8 illustrates the ramp rollover classification algorithm 200. The ramp rollover classification algorithm 200 uses vehicle metrics to classify a rollover event as a ramp rollover event. The ramp rollover classification algorithm 200 of FIG. 8 is shown for left rollover events, i.e., the vehicle rolling to the left or driver side in response to the rollover event. It should, however, be appreciated that the algorithms shown in FIG. 8 also apply to right rollover events, the only difference being sign (+/−) of the values used in the classification metrics is opposite. In other words, the classification metrics for right rollover events would be identical to those shown in FIG. 8, except that the sign of the respective axes for the different metric values within the classification metrics (with the exception of AMA_Z, which does not change) would be opposite, e.g., negative instead of positive and vice versa.

The ramp rollover classification algorithm 200 implements four different classification metrics to classify a ramp event. The four ramp classification metrics are:
AMA_Y vs. R_ANGLE (metric 202)
AMA_Z vs. R_ANGLE (metric 204)
R_RATE vs. R_ANGLE (metric 206)
D_RATE vs. R_ANGLE (metric 208)

The lateral acceleration vs. roll angle classification metric 202 utilizes AMA_Y and R_ANGLE to produce an output, which is fed to AND block 210. As shown, the AMA_Y vs. R_ANGLE classification metric 202 is triggered when the metric crosses the dashed-line threshold and enters the shaded trigger zone (indicated generally by a star). The metric 202 remains ON while the metric is in the trigger zone. The solid line in the AMA_Y vs. R_ANGLE classification metric 202 is representative of the metric when the vehicle is undergoing a ramp rollover event. The AMA_Y vs. R_ANGLE classification metric 200 is a no-latch metric, meaning that the metric is ON only when the metric is in the trigger zone.

The vertical acceleration vs. roll angle classification metric 204 utilizes AMA_Z and R_ANGLE to produce an output, which is fed to AND block 210. As shown, the AMA_Z vs. R_ANGLE classification metric 204 is triggered when the metric crosses the dashed-line threshold and enters the shaded trigger zone (indicated generally by a star). The metric 204 remains ON while the metric is in the trigger zone. Note here, however, that the lower extent of the trigger zone is not bounded by a dashed line, which indicates that the lower limit for that metric (in this case AMA_Z) is infinite and therefore cannot be crossed. The solid line in the AMA_Z vs. R_ANGLE classification metric 204 is representative of the metric when the vehicle is undergoing a ramp rollover event. The AMA_Z vs. R_ANGLE classification metric 204 is a no-latch metric, which means that the metric is ON only when the metric is in the trigger zone.

A roll rate vs. roll angle classification metric 206 utilizes R_RATE and R_ANGLE to produce an output, which is fed to AND block 210. As shown, the R_RATE vs. R_ANGLE classification metric 206 is triggered when the metric crosses the dashed-line threshold and enters the shaded trigger zone (indicated generally by a star). The metric 206 remains ON while the metric is in the trigger zone. Note here, however, that the upper extent of the trigger zone is not bounded by a dashed line, which indicates that the upper limit for that metric (in this case R_RATE) is infinite and cannot be crossed. The solid line in the R_RATE vs. R_ANGLE classification metric 206 is representative of the metric when the vehicle is undergoing a ramp rollover event. The R_RATE vs. R_ANGLE classification metric 206 is a no-latch metric, which means that the metric is ON only when the metric is in the trigger zone.

An angular or roll acceleration vs. roll angle classification metric 208 utilizes D_RATE and R_ANGLE to produce an output, which is fed to AND block 210. As shown, the D_RATE vs. R_ANGLE classification metric 208 is ON when the metric crosses the dashed-line threshold and enters the shaded trigger zone (indicated generally by a star). The metric 208 remains ON while the metric is in the trigger zone. The solid line in the D_RATE vs. R_ANGLE classification metric 208 is representative of the metric when the vehicle is undergoing a ramp rollover event. The D_RATE vs. R_ANGLE classification metric 208 is a no-latch metric, which means that the metric is ON only when the metric is in the trigger zone.

The ramp rollover classification algorithm 200 implements Boolean logic to determine whether to issue a ramp classification ON indication at block 218. As shown in FIG. 8, the ramp classification ON 218 is triggered in response to the output of the SET/RESET function 214, i.e., AND block 218. According to the SET/RESET function 214, all four metrics 202, 204, 206, 208 being on at the same time (AND block 210) for a configurable period of time (timer block 212) will trigger OR block 216 ON, which is fed to the SET input of AND block 218. This will trigger AND block 218 and the ramp classification ON, as long as the conditions fed to the RESET input of AND block 218 are not present (the circle at the RESET input of AND block 218 represents a Boolean NOT).

Once the SET/RESET function 214 is set ON and the ramp classification ON 220 is ON, it remains ON until a reset condition occurs. The RESET condition occurs when timer block 228 is ON, which occurs when OR block 226 is ON for a configurable period of time, as determined at the timer block 228. As shown in FIG. 8, OR block 226 is ON when either R_ANGLE=0 (block 222) or the rollover discrimination metric 160 is within the reset box 162 for a configurable period of time defined by the timer block 228. The ramp classification ON 220 is thus latched until at least one of these reset conditions are established.

Ditch Rollover Classification Algorithm

FIG. 9 illustrates the ditch rollover classification algorithm 240. The ditch rollover classification algorithm 240 uses vehicle metrics to classify a rollover event as a ditch rollover event. The ditch rollover classification algorithm 240 of FIG. 9 is shown for left rollover events, i.e., the vehicle rolling to the left or driver side in response to the rollover event. It should, however, be appreciated that the algorithms shown in FIG. 9 also apply to right rollover events, the only difference being sign (+/−) of the values used in the classification metrics is opposite. In other words, the classification metrics for right rollover events would be identical to those shown in FIG. 9, except that the sign of the respective axes for the different metric values within the classification metrics (with the exception of AMA_Z, which does not change) would be opposite, e.g., negative instead of positive and vice versa.

The ditch rollover classification algorithm 240 implements four different classification metrics to classify a ditch event. The four ditch classification metrics are:
AMA_Y vs. R_ANGLE (metric 242)
AMA_Z vs. R_ANGLE (metric 244)
R_RATE vs. R_ANGLE (metric 246)
D_RATE vs. R_ANGLE (metric 248)

The lateral acceleration vs. roll angle classification metric 242 utilizes AMA_Y and R_ANGLE to produce an output, which is fed to AND block 250. As shown, the AMA_Y vs. R_ANGLE classification metric 242 is triggered when the metric crosses the dashed-line threshold and enters the shaded trigger zone (indicated generally by a star). The metric 242 remains ON while the metric is in the trigger zone. Note here, however, that the lower extent of the trigger zone is not bounded by a dashed line, which indicates that the lower limit for that metric (in this case AMA_Y) is infinite and cannot be crossed. The solid line in the AMA_Y vs. R_ANGLE classification metric 242 is representative of the metric when the vehicle is undergoing a ditch rollover event. The AMA_Y vs. R_ANGLE classification metric 240 is a no-latch metric, meaning that the metric is ON only when the metric is in the trigger zone.

The vertical acceleration vs. roll angle classification metric 244 utilizes AMA_Z and R_ANGLE to produce an output, which is fed to AND block 250. As shown, the AMA_Z vs. R_ANGLE classification metric 244 is triggered when the metric crosses the dashed-line threshold and enters the shaded trigger zone (indicated generally by a star). The metric 244 remains ON while the metric is in the trigger zone. Note here, however, that the upper extent of the trigger zone is not bounded by a dashed line, which indicates that the upper limit for that metric (in this case AMA_Z) is infinite and cannot be crossed. The solid line in the AMA_Z vs. R_ANGLE classification metric 244 is representative of the metric when the vehicle is undergoing a ditch rollover event. The AMA_Z vs. R_ANGLE classification metric 244 is a no-latch metric, which means that the metric is ON only when the metric is in the trigger zone.

A roll rate vs. roll angle classification metric 246 utilizes R_RATE and R_ANGLE to produce an output, which is fed to AND block 250. As shown, the R_RATE vs. R_ANGLE classification metric 246 is triggered when the metric crosses the dashed-line threshold and enters the shaded trigger zone (indicated generally by a star). The metric 246 remains ON while the metric remains in the trigger zone. Note here, however, that the upper extent of the trigger zone is not bounded by a dashed line, which indicates that the upper limit for that metric (in this case R_RATE) is infinite and cannot be crossed. The solid line in the R_RATE vs. R_ANGLE classification metric 246 is representative of the metric when the vehicle is undergoing a ditch rollover event. The R_RATE vs. R_ANGLE classification metric 246 is a no-latch metric, which means that the metric is ON only when the metric is in the trigger zone.

An angular or roll acceleration vs. roll angle classification metric 248 utilizes D_RATE and R_ANGLE to produce an output, which is fed to AND block 250. As shown, the D_RATE vs. R_ANGLE classification metric 248 is ON when the metric crosses the dashed-line threshold and enters the shaded trigger zone (indicated generally by a star). The metric 248 remains ON while the metric is in the trigger zone. The solid line in the D_RATE vs. R_ANGLE classification metric 248 is representative of the metric when the vehicle is undergoing a ditch rollover event. The D_RATE vs. R_ANGLE classification metric 248 is a no-latch metric, which means that the metric is ON only when the metric is in the trigger zone.

The ditch rollover classification algorithm 240 implements Boolean logic to determine whether to issue a ditch classification ON indication at block 258. As shown in FIG. 9, the ditch classification ON 258 is triggered in response to the output of the SET/RESET function 254, i.e., AND block 258. According to the SET/RESET function 254, all four metrics 242, 244, 246, 248 being on at the same time (AND block 250) for a configurable period of time (timer block 252) will trigger OR block 256 ON, which is fed to the SET input of AND block 258. This will trigger AND block 258 and the ditch classification ON, as long as the conditions fed to the RESET input of AND block 258 are not present (the circle at the RESET input of AND block 258 represents a Boolean NOT).

Once the SET/RESET function 254 is set ON and the ditch classification ON 260 is ON, it remains ON until a reset condition occurs. The RESET condition occurs when timer block 268 is ON, which occurs when OR block 266 is ON for a configurable period of time, as determined at the timer block 268. As shown in FIG. 9, OR block 266 is ON when either R_ANGLE=0 (block 262) or the rollover discrimination metric 160 is within the reset box 162 for a configurable period of time defined by the timer block 268. The ditch classification ON 260 is thus latched until at least one of these reset conditions are established.

Soil Rollover Classification Algorithm—Soft Soil

FIG. 10 illustrates the soil rollover classification algorithm 280. The soil rollover classification algorithm 280 uses vehicle metrics to classify a rollover event as a soil rollover event. The soil rollover classification algorithm 280 of FIG. 10 is shown for left rollover events, i.e., the vehicle rolling to the left or driver side in response to the rollover event. It should, however, be appreciated that the algorithms shown in FIG. 10 also apply to right rollover events, the only difference being sign (+/−) of the values used in the classification metrics is opposite. In other words, the classification metrics for right rollover events would be identical to those shown in FIG. 10, except that the sign of the respective axes for the different metric values within the classification metrics would be opposite, e.g., negative instead of positive and vice versa.

The soil rollover classification algorithm 280 implements four different classification metrics to classify a soil event. The four soil classification metrics are:
  AMA_Y vs. R_ANGLE (metric 282)
  AMA_Z vs. R_ANGLE (metric 284)
  R_RATE vs. R_ANGLE (metric 286)
  D_RATE vs. R_RATE_2 (metric 288)

The lateral acceleration vs. roll angle classification metric 282 utilizes AMA_Y and R_ANGLE to produce an output, which is fed to AND block 290. As shown, the AMA_Y vs. R_ANGLE classification metric 282 is triggered when the metric crosses the dashed-line threshold and enters the shaded trigger zone (indicated generally by a star). The metric 282 remains ON while the metric is in the trigger zone. Note here, however, that the lower extent of the trigger zone is not bounded by a dashed line, which indicates that the lower limit for that metric (in this case AMA_Y) is infinite and cannot be crossed. The solid line in the AMA_Y vs. R_ANGLE classification metric 282 is representative of the metric when the vehicle is undergoing a soil rollover event. The AMA_Y vs. R_ANGLE classification metric 280 is a no-latch metric, meaning that the metric is ON only when the metric is in the trigger zone.

The vertical acceleration vs. roll angle classification metric 284 utilizes AMA_Z and R_ANGLE to produce an output, which is fed to AND block 290. As shown, the AMA_Z vs. R_ANGLE classification metric 284 is triggered when the metric crosses the dashed-line threshold and enters the shaded trigger zone (indicated generally by a star). The metric remains ON while the metric is in the trigger zone. The solid line in the AMA_Z vs. R_ANGLE classification metric 284 is representative of the metric when the vehicle is undergoing a soil rollover event. The AMA_Z vs. R_ANGLE classification metric 284 is a no-latch metric, which means that the metric is ON only when the metric is in the trigger zone.

A roll rate vs. roll angle classification metric 286 utilizes R_RATE and R_ANGLE to produce an output, which is fed to AND block 290. As shown, the R_RATE vs. R_ANGLE classification metric 286 is triggered when the metric crosses the dashed-line threshold and enters the shaded trigger zone (indicated generally by a star). The metric 286 remains ON while the metric is in the shaded trigger zone. Note here, however, that the upper extent of the trigger zone is not bounded by a dashed line, which indicates that the upper limit for that metric (in this case R_RATE) is infinite and cannot be crossed. The solid line in the R_RATE vs. R_ANGLE classification metric 286 is representative of the metric when the vehicle is undergoing a soil rollover event. The R_RATE vs. R_ANGLE classification metric 286 is a no-latch metric, which means that the metric is ON only when the metric is in the trigger zone.

Note that, in FIG. 10, the trigger zones of the metrics 282, 284, 286 are spaced from their respective vertical axes. As a result, the roll angle thresholds for their respective trigger zones are increased, for example, a metric where the trigger zone begins at or near the vertical axis, i.e., a low roll angle threshold. This is because soil conditions can affect how a vehicle rollover event will develop. In the case of soft soil conditions, a rollover event is comparatively slow to develop over, say mid-soil or hard soil/curb conditions. Therefore, the trigger zone can be positioned to select the roll angle threshold for the trigger zone in accordance with the soil condition. In FIG. 10, the spacing is comparatively large to account for the soft soil conditions.

An angular or roll acceleration vs. roll rate classification metric 288 utilizes D_RATE and R_RATE_2 to produce an output, which is fed to AND block 290. In FIG. 10, the output of the roll acceleration vs. roll rate classification metric 288 is a soft soil ON signal. As shown, the D_RATE vs. R_RATE_2 classification metric 288 is ON for a particular soil classification when the metric leaves the shaded zone crosses the dashed-line threshold into one of the three soil zones: hard soil/curb, mid-soil, and soft soil. The output of the D_RATE vs. R_RATE_2 classification metric 288, i.e., hard soil/curb ON, mid-soil ON, soft soil ON, is determined by the first soil zone the metric enters after leaving the shaded zone. Thus, under the example conditions shown in FIG. 10, output of the D_RATE vs. R_RATE_2 classification metric 288 is Soft Soil ON because the metric enters the soft soil zone directly from the shaded zone, as indicated generally by the star in FIG. 10.

The soil rollover classification algorithm 280 implements Boolean logic to determine whether to issue a soil classification ON indication at block 298. As shown in FIG. 10, the soil classification ON 298 is triggered in response to the output of the SET/RESET function 294, i.e., AND block 298. According to the SET/RESET function 294, all four metrics 282, 284, 286, 288 being on at the same time (AND block 290) for a configurable period of time (timer block 292) will trigger OR block 296 ON, which is fed to the SET input of AND block 298. This will trigger AND block 298 and the soil classification ON, as long as the conditions fed to the RESET input of AND block 298 are not present (the circle at the RESET input of AND block 298 represents a Boolean NOT).

Once the SET/RESET function 294 is set ON and the soil classification ON 300 is ON, it remains ON until a reset condition occurs. The RESET condition occurs when timer block 308 is ON, which occurs when OR block 306 is ON for a configurable period of time, as determined at the timer block 308. As shown in FIG. 10, OR block 306 is ON when either R_ANGLE=0 (block 302) or the rollover discrimination metric 160 is within the reset box 162 for a configurable period of time defined by the timer block 308. The soil classification ON 300 is thus latched until at least one of these reset conditions are established.

Soil Rollover Classification Algorithm—Mid-Soil

FIG. 11 illustrates the mid-soil rollover classification algorithm 320. The mid-soil rollover classification algorithm 320 uses vehicle metrics to classify a rollover event as a mid-soil rollover event. The mid-soil rollover classification algorithm 320 of FIG. 11 is shown for left rollover events, i.e., the vehicle rolling to the left or driver side in response to the rollover event. It should, however, be appreciated that the algorithms shown in FIG. 11 also apply to right rollover events, the only difference being sign (+/−) of the values used in the classification metrics is opposite. In other words, the classification metrics for right rollover events would be identical to those shown in FIG. 11, except that the sign of the respective axes for the different metric values within the classification metrics would be opposite, e.g., negative instead of positive and vice versa.

The mid-soil rollover classification algorithm 320 implements four different classification metrics to classify a mid-soil event. The four mid-soil classification metrics are:

AMA_Y vs. R_ANGLE (metric 322)
AMA_Z vs. R_ANGLE (metric 324)
R_RATE vs. R_ANGLE (metric 326)
D_RATE vs. R_RATE_2 (metric 328)

The lateral acceleration vs. roll angle classification metric 322 utilizes AMA_Y and R_ANGLE to produce an output, which is fed to AND block 330. As shown, the AMA_Y vs. R_ANGLE classification metric 322 is triggered when the metric crosses the dashed-line threshold and enters the shaded trigger zone (indicated generally by a star). The metric remains ON while the metric is in the trigger zone. Note here, however, that the lower extent of the trigger zone is not bounded by a dashed line, which indicates that the lower limit for that metric (in this case AMA_Y) is infinite and cannot be crossed. The solid line in the AMA_Y vs. R_ANGLE classification metric 322 is representative of the metric when the vehicle is undergoing a mid-soil rollover event. The AMA_Y vs. R_ANGLE classification metric 320 is a no-latch metric, meaning that the metric is ON only when the metric is in the trigger zone.

The vertical acceleration vs. roll angle classification metric 324 utilizes AMA_Z and R_ANGLE to produce an output, which is fed to AND block 330. As shown, the AMA_Z vs. R_ANGLE classification metric 324 is triggered when the metric crosses the dashed-line threshold and enters the shaded trigger zone (indicated generally by a star). The metric remains ON while the metric is in the trigger zone. The solid line in the AMA_Z vs. R_ANGLE classification metric 324 is representative of the metric when the vehicle is undergoing a mid-soil rollover event. The AMA_Z vs. R_ANGLE classification metric 324 is a no-latch metric, which means that the metric is ON only when the metric is in the trigger zone.

A roll rate vs. roll angle classification metric 326 utilizes R_RATE and R_ANGLE to produce an output, which is fed to AND block 330. As shown, the R_RATE vs. R_ANGLE classification metric 326 is triggered when the metric crosses the dashed-line threshold and enters the shaded trigger zone (indicated generally by a star). The metric remains ON while the metric is in the shaded trigger zone. Note here, however, that the upper extent of the trigger zone is not bounded by a dashed line, which indicates that the upper limit for that metric (in this case R_RATE) is infinite and cannot be crossed. The solid line in the R_RATE vs. R_ANGLE classification metric 326 is representative of the metric when the vehicle is undergoing a mid-soil rollover event. The R_RATE vs. R_ANGLE classification metric 326 is a no-latch metric, which means that the metric is ON only when the metric is in the trigger zone.

Note that, in FIG. 11, the trigger zones of the metrics 322, 324, 326 are spaced from their respective vertical axes. As a result, the roll angle thresholds for their respective trigger zones are increased, for example, a metric where the trigger zone begins at or near the vertical axis, i.e., a low roll angle threshold. This is because soil conditions can affect how a vehicle rollover event will develop. In the case of mid-soil conditions, a rollover event is comparatively slow to develop compared to hard soil/curb conditions, and comparatively fast to develop compared to soft soil conditions. Therefore, the trigger zone can be positioned to select the roll angle threshold for the trigger zone in accordance with the soil condition. In FIG. 11, the spacing is smaller than soft soil conditions (FIG. 10) to account for the mid-soil conditions.

An angular or roll acceleration vs. roll rate classification metric 328 utilizes D_RATE and R_RATE_2 to produce an output, which is fed to AND block 330. In FIG. 11, the output of the roll acceleration vs. roll rate classification metric 328 is a mid soil ON signal. As shown, the D_RATE vs. R_RATE_2 classification metric 328 is ON for a particular soil classification when the metric leaves the shaded zone crosses the dashed-line threshold into one of the three soil zones: hard soil/curb, mid-soil, and soft soil. The output of the D_RATE vs. R_RATE_2 classification metric 328, i.e., hard soil/curb ON, mid-soil ON, soft soil ON, is determined by the first soil zone the metric enters after leaving the shaded zone. Thus, under the example conditions shown in FIG. 11, output of the D_RATE vs. R_RATE_2 classification metric 328 is Mid-soil ON because the metric enters the mid-soil zone directly from the shaded zone, as indicated generally by the star in FIG. 11.

The mid-soil rollover classification algorithm 320 implements Boolean logic to determine whether to issue a mid-soil classification ON indication at block 338. As shown in FIG. 11, the mid-soil classification ON 338 is triggered in response to the output of the SET/RESET function 334, i.e., AND block 338. According to the SET/RESET function 334, all four metrics 322, 324, 326, 328 being on at the same time (AND block 330) for a configurable period of time (timer block 332) will trigger OR block 336 ON, which is fed to the SET input of AND block 338. This will trigger AND block 338 and the mid-soil classification ON, as long as the conditions fed to the RESET input of AND block 338 are not present (the circle at the RESET input of AND block 338 represents a Boolean NOT).

Once the SET/RESET function 334 is set ON and the mid-soil classification ON 340 is ON, it remains ON until a reset condition occurs. The RESET condition occurs when timer block 348 is ON, which occurs when OR block 346 is ON for a configurable period of time, as determined at the timer block 348. As shown in FIG. 11, OR block 346 is ON when either R_ANGLE=0 (block 342) or the rollover discrimination metric 160 is within the reset box 162 for a configurable period of time defined by the timer block 348. The mid-soil classification ON 340 is thus latched until at least one of these reset conditions are established.

Soil Rollover Classification Algorithm—Hard Soil/Curb

FIG. 12 illustrates the curb rollover classification algorithm 360. The curb rollover classification algorithm 360 uses vehicle metrics to classify a rollover event as a curb rollover event. The curb rollover classification algorithm 360 of FIG. 12 is shown for left rollover events, i.e., the vehicle rolling to the left or driver side in response to the rollover event. It should, however, be appreciated that the algorithms shown in FIG. 12 also apply to right rollover events, the only difference being sign (+/−) of the values used in the classification metrics is opposite. In other words, the classification metrics for right rollover events would be identical to those shown in FIG. 12, except that the sign of the respective axes for the different metric values within the classification metrics would be opposite, e.g., negative instead of positive and vice versa.

The curb rollover classification algorithm 360 implements four different classification metrics to classify a curb event. The four curb classification metrics are:
AMA_Y vs. R_ANGLE (metric 362)
AMA_Z vs. R_ANGLE (metric 364)
R_RATE vs. R_ANGLE (metric 366)
D_RATE vs. R_RATE_2 (metric 368)

The lateral acceleration vs. roll angle classification metric 362 utilizes AMA_Y and R_ANGLE to produce an output, which is fed to AND block 370. As shown, the AMA_Y vs. R_ANGLE classification metric 362 is triggered when the metric crosses the dashed-line threshold and enters the shaded trigger zone (indicated generally by a star). The metric remains ON while the metric is in the trigger zone. Note here, however, that the lower extent of the trigger zone is not bounded by a dashed line, which indicates that the lower limit for that metric (in this case AMA_Y) is infinite and cannot be crossed. The solid line in the AMA_Y vs. R_ANGLE classification metric 362 is representative of the metric when the vehicle is undergoing a curb rollover event. The AMA_Y vs. R_ANGLE classification metric 360 is a no-latch metric, meaning that the metric is ON only when the metric is in the trigger zone.

The vertical acceleration vs. roll angle classification metric 364 utilizes AMA_Z and R_ANGLE to produce an output, which is fed to AND block 370. As shown, the AMA_Z vs. R_ANGLE classification metric 364 is triggered when the metric crosses the dashed-line threshold and enters the shaded trigger zone (indicated generally by a star). The metric remains ON while the metric is in the shaded trigger zone. The solid line in the AMA_Z vs. R_ANGLE classification metric 364 is representative of the metric when the vehicle is undergoing a curb rollover event. The AMA_Z vs. R_ANGLE classification metric 364 is a no-latch metric, which means that the metric is ON only when the metric is in the trigger zone.

A roll rate vs. roll angle classification metric 366 utilizes R_RATE and R_ANGLE to produce an output, which is fed to AND block 370. As shown, the R_RATE vs. R_ANGLE classification metric 366 is triggered when the metric crosses the dashed-line threshold and enters the shaded trigger zone (indicated generally by a star). The metric remains ON while the metric is in the shaded trigger zone bounded by the dashed lines. Note here, however, that the upper extent of the trigger zone is not bounded by a dashed line, which indicates that the upper limit for that metric (in this case R_RATE) is infinite and cannot be crossed. The solid line in the R_RATE vs. R_ANGLE classification metric 366 is representative of the metric when the vehicle is undergoing a curb rollover event. The R_RATE vs. R_ANGLE classification metric 366 is a no-latch metric, which means that the metric is ON only when the metric is in the trigger zone.

Note that, in FIG. 12, the trigger zones of the metrics 362, 364, 366 are spaced from their respective vertical axes. As a result, the roll angle thresholds for their respective trigger zones are increased, for example, a metric where the trigger zone begins at or near the vertical axis, i.e., a low roll angle threshold. This is because soil conditions can affect how a vehicle rollover event will develop. In the case of hard-soil conditions, a rollover event is comparatively fast to develop compared to soft soil and mid-soil conditions. Therefore, the trigger zone can be positioned to select the roll angle threshold for the trigger zone in accordance with the soil condition. In FIG. 12, the spacing is smaller than mid-soil conditions (FIG. 11) to account for the hard soil/curb conditions.

An angular or roll acceleration vs. roll rate classification metric 368 utilizes D_RATE and R_RATE_2 to produce an output, which is fed to AND block 370. In FIG. 12, the output of the roll acceleration vs. roll rate classification metric 368 is a hard soil ON signal. As shown, the D_RATE vs. R_RATE_2 classification metric 368 is ON for a particular soil classification when the metric leaves the shaded zone crosses the dashed-line threshold into one of the three soil zones: hard soil/curb, mid-soil, and soft soil. The output of the D_RATE vs. R_RATE_2 classification metric 368, i.e., hard soil/curb ON, mid-soil ON, soft soil ON, is determined by the first soil zone the metric enters after leaving the shaded zone. Thus, under the example conditions shown in FIG. 12, output of the D_RATE vs. R_RATE_2 classification metric 368 is Hard Soil/Curb ON because the metric enters the hard soil/curb zone directly from the shaded zone, as indicated generally by the star in FIG. 12.

The curb rollover classification algorithm 360 implements Boolean logic to determine whether to issue a curb classification ON indication at block 378. As shown in FIG. 12, the curb classification ON 378 is triggered in response to the output of the SET/RESET function 374, i.e., AND block 378. According to the SET/RESET function 374, all four metrics 362, 364, 366, 368 being on at the same time (AND block 370) for a configurable period of time (timer block 372) will trigger OR block 376 ON, which is fed to the SET input of AND block 378. This will trigger AND block 378 and the curb classification ON, as long as the conditions fed to the RESET input of AND block 378 are not present (the circle at the RESET input of AND block 378 represents a Boolean NOT).

Once the SET/RESET function 374 is set ON and the curb classification ON 380 is ON, it remains ON until a reset condition occurs. The RESET condition occurs when timer block 388 is ON, which occurs when OR block 386 is ON for a configurable period of time, as determined at the timer block 388. As shown in FIG. 12, OR block 386 is ON when either R_ANGLE=0 (block 382) or the rollover discrimination metric 160 is within the reset box 162 for a configurable period of time defined by the timer block 388. The curb classification ON 380 is thus latched until at least one of these reset conditions are established.

Normal Rollover Deployment Algorithm

Referring back to FIG. 4, the normal rollover deployment algorithm 152 is activated by the rollover deployment algorithm 150 in response to the off-road detection metric 156 (FIG. 6) determining that the vehicle 12 is being used in a normal, i.e., not off-road, manner. When the normal rollover deployment algorithm 152 is active (block 156=NO), AND blocks 230 and 232 are enabled to determine firing conditions. As shown in FIG. 4, either AND block 230, 232, when enabled by block 156=NO, will trigger firing of the actuatable restraints at block 192.

A first firing condition of the normal rollover deployment algorithm 152 occurs at AND block 230 when the normal rollover threshold of the discrimination metrics 160 (FIG. 5) is crossed and the safing function 170 (FIG. 7) is ON. If both conditions are satisfied, the fire actuatable restraints command 192 is issued. Note that, as described above, once the normal threshold is crossed, it is latched until the R_RATE is equal to zero or the metric is inside the reset box 162. Note also that the safing function 170 is latched and remains ON for a predetermined period of time after the metric re-enters the safing region 174, as determined by the configurable latch duration period (see, FIG. 7). Therefore, the timing of the two firing conditions at AND block 230 can vary and need not occur simultaneously.

A second firing condition of the normal rollover deployment algorithm 152 occurs at AND block 232 when a specific rollover threshold of the discrimination metrics 160 (FIG. 5) is crossed and matching specific rollover classification determination 180 (see, FIGS. 8-12) is ON. If both conditions are satisfied, the fire actuatable restraints command 150 is issued. Note that, as described above, the specific rollover classifications are latched, as is the specific rollover threshold determined by the discrimination metrics 160. Therefore, the timing of the two firing conditions at AND block 232 can vary and need not occur simultaneously. The timing of the firing conditions can be selected via the tunable timing parameters of the discrimination metrics 160 and the specific rollover classification determination algorithms 180.

Off-Road Rollover Deployment Algorithm

Referring to FIG. 4, the off-road rollover deployment algorithm 154 is activated by the rollover deployment algorithm 150 in response to the off-road detection metric 156 (FIG. 6) determining that the vehicle 12 is being used in an off-road manner. When the off-road rollover deployment algorithm 154 is active (block 156=YES), AND blocks 184 and 274 are enabled to determine firing conditions. As shown in FIG. 4, either of AND blocks 184 and 274, when enabled by block 156=YES, will trigger firing of the actuatable restraints at block 192, although the conditions satisfying AND block 274 require additional timing and D_RATE threshold considerations (see, blocks 274, 276, 278), which are discussed below.

A first firing condition of the off-road rollover deployment algorithm 154 occurs at AND block 184 when the off-road rollover threshold of the discrimination metrics 160 (FIG. 5) is crossed and at least one of the two conditions inputted into OR block 182 is ON. More specifically, OR block 182 is ON when either the safing function 170 (FIG. 7) is ON or any one of the specific rollover classifications 180 (see, FIGS. 8-11) are ON. If both conditions are satisfied, AND block 184 is ON and the fire actuatable restraints command 192 is issued.

It can thus be seen that, according to the first firing condition, during off-road use when the off-road rollover threshold is crossed, firing takes place in response to either normal safing or any rollover classification. Because the vehicle is being used off-road, rollover is less predictable and the normal rollover threshold might get crossed during intense off-road maneuvers. This first firing condition takes this into account by increasing the roll-over threshold (see, the off-road threshold of FIG. 5) while, at the same time, reducing the roll-over confirmation by accepting any of the specific rollover classifications or the normal safing function.

Note that, as described above in reference to FIG. 6, once the off-road threshold is crossed, it is latched until the R_ANGLE is equal to zero or the rollover discrimination metric 160 is inside the reset box 162. Also, note that the safing function 170 is latched and remains ON for a predetermined period of time after the metric re-enters the safing region 174, as determined by the configurable latch duration period (see, FIG. 7). Further, note that the specific rollover classifications 180 are latched due to the SET/RESET functionality implemented therein, which is described above in reference to FIGS. 8-12. Therefore, the timing of the firing conditions at AND block 184 can vary and need not occur precisely simultaneously.

Those skilled in the art will appreciate that raised off-road threshold could delay firing the actuatable restraints in off-road scenarios where rollover events occur. Advantageously, the off-road rollover deployment algorithm 154 implements a second firing condition that implements a D_Rate metric to help eliminate any such delay. This is shown at blocks 274, 276, and 278. As shown in AND blocks 274 and 278, the second firing condition occurs in response to off-road use detected (block 156), a specific rollover classification being made (see block 180, FIGS. 8-12), the threshold corresponding to classification being crossed (see block 160, FIG. 5), and the D_Rate threshold NOT crossed (see D_Rate metric 400, FIG. 14).

In response to AND block 274 being satisfied ON, timer block 276 begins a countdown having a configurable countdown duration. The output of the timer block 276 is OFF while timing and ON when timed out, and is passed to AND block 278. The purpose of the D_Rate metric 400 is to provide a means by which the actuatable restraints can be fired during an off-road use where a specific rollover threshold is crossed and verified by a corresponding specific rollover classification, while still preventing firing in response to off-road vehicle use. Essentially, the D_RATE is used as an early indicator of whether 1) the vehicle is continuing toward a rollover as indicated by the detected roll condition, or 2) the detected roll was due to the extremes of off-road use, where the roll has ceased and the vehicle is returning in the opposite direction. If, after the expiration of timer block 276, the D_Rate indicates the vehicle is continuing toward a rollover (block 400—D_Rate threshold not crossed), AND block 278 is triggered ON and the actuatable restraints are fired (block 192).

D Rate Metric

Figure 13:
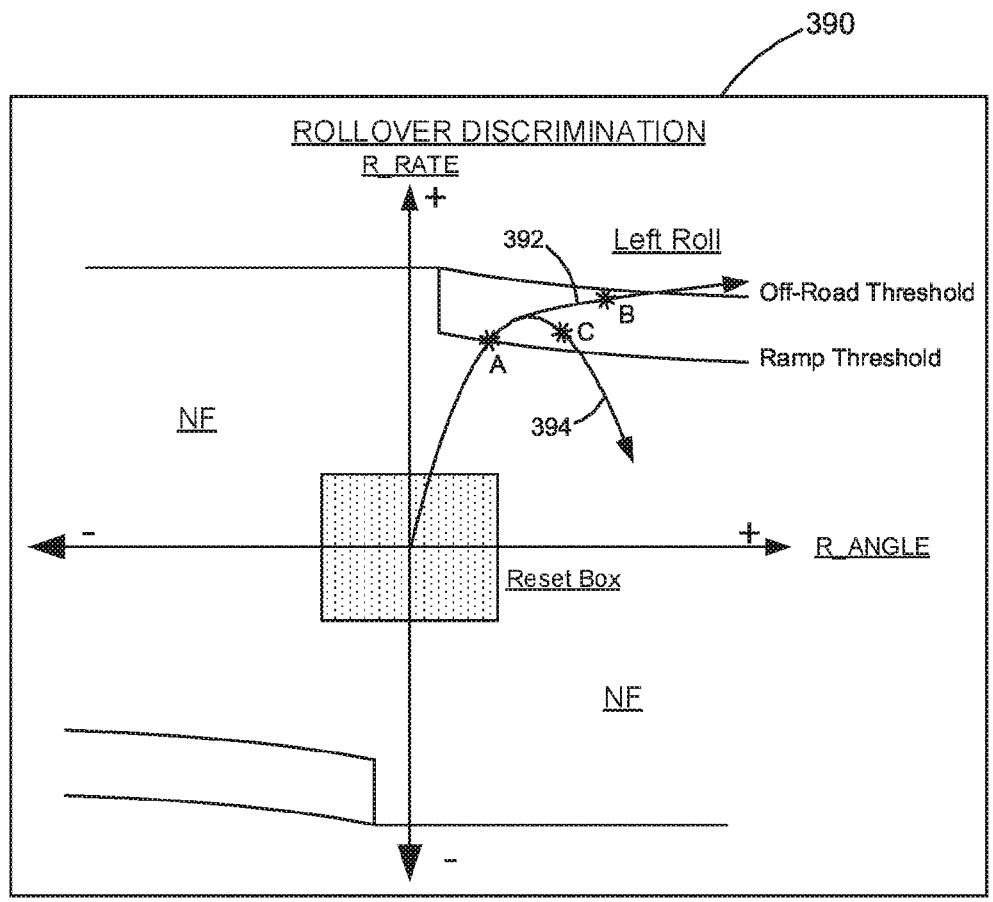
FIG. 13 is a diagram illustrating discrimination metrics, including thresholds for determining the occurrence of a rollover event, implemented in the vehicle safety system according to a D-Rate threshold rollover detection feature.
Figure 14:
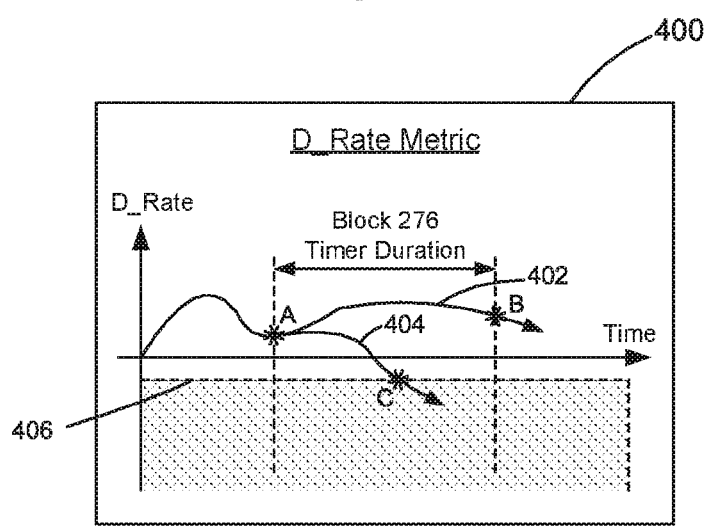
FIG. 14 is a diagram illustrating D-Rate threshold metrics implemented in the vehicle safety system.

The D_Rate metric 400 is illustrated in FIG. 14. In FIG. 14, the D_Rate metric 400 includes two example metrics 402, 404 that are used to describe the function of the metric. In describing this function, reference is made to FIG. 13, which illustrates a rollover discrimination metric 390, which shows two example metrics 392, 394 that correspond to the metrics 402, 404, respectively, in FIG. 14. In other words, metrics 392 and 402 correspond to one event, and metrics 394 and 404 correspond to another event.

In addition to the off-road threshold, FIG. 13 also illustrates the ramp threshold for purposes of example. The example of FIGS. 13 and 14 could be carried out with any of the other thresholds described herein (ramp, ditch, soft soil, mid-soil, hard soil). As shown in FIG. 13, the metric 392 crosses the ramp threshold (see star A) and eventually crosses the off-road threshold. Metric 392 is therefore indicative of a rollover event for which firing of the actuatable restraint is desired. The metric 394 also crosses the ramp threshold, but reverses thereafter and never reaches the off-road threshold. Metric 394 is therefore not indicative of a rollover event for which firing of the actuatable restraint is desired. Metric 394 can be attributed to the extremes of the vehicle off-road use.

The D_Rate metric 400 monitors the D_Rate over time and determines whether the metric crosses/enters the D_Rate threshold 406. For reference, the D_Rate metric 400 (FIG. 14) is annotated with the timer duration of block 276 (see FIG. 4) and also with star indicators A, B, and C that correspond with the star indicators shown in FIG. 13. Through FIGS. 13 and 14, the implementation of the D_Rate metric 400, as it applies to the fire events of metrics 392 and 402, and the no-fire event of metrics 394 and 404 are described.

In the examples of FIGS. 13 and 14, both metrics follow the same initial trajectory, crossing the ramp threshold at star A. At this point, it is presumed that the corresponding classification 180, in this case, ramp classification 200 (see FIG. 8), is also ON. Because of this, AND block 274 (FIG. 4) is ON and timer block 276 starts timing, as shown in FIG. 14. In the case of the no-fire event, the magnitude of the metric 394 peaks prior to crossing the off-road threshold and begins to go down. At the same time, the D-Rate threshold metric 400 sees this as a lowering or reduction of the D_Rate, which crosses the D_Rate threshold 406 at star C, which is also shown in FIG. 13. The D_Rate crossing the threshold 406 causes block 400 in FIG. 4 (threshold NOT crossed) to be OFF or 0, which prevents AND block 278 from firing the actuatable restraints.

In the case of the fire event, the magnitude of the metric 392 continues upward and eventually crosses off-road threshold. If it crosses the threshold, the actuatable restraint will fire, assuming that the other conditions (see AND block 184 of FIG. 4) are met. Knowing this, it will be appreciated that firing the actuatable restraint earlier in time, i.e., before being triggered by the off-road threshold, may be beneficial. This is where the implementation of the D_Rate metric 400 proves advantageous. As shown in FIG. 14, the D_Rate metric 402 corresponding with the discrimination metric 392 remains well above the D_Rate threshold 406 throughout the duration of the timer 276. Thus, when the timer 276 expires, the D_Rate metric 402 has not crossed the D_Rate threshold 406. This causes block 400 in FIG. 4 (D_Rate Threshold NOT Crossed) to be ON or 1, which triggers AND block 278 and a fire actuatable restraints command 192 is issued.

From the above description of the invention, those skilled in the art will appreciate that the described vehicle safety system implements algorithms that use the D_Rate to improve rollover discrimination and responsiveness during off-road vehicle use. Those skilled in the art will also perceive improvements, changes and modifications to the disclosed system and methods that fall within the spirit and scope of the invention. These improvements, changes, and/or modifications are intended to be covered by the appended claims.

Having described the invention, the following is claimed:

1. A vehicle safety system comprising:
   an actuatable restraint for helping to protect a vehicle occupant; and
   a controller for controlling actuation of the actuatable restraint in response to a vehicle rollover event;
   wherein the controller is configured to execute an off-road detection metric configured to evaluate a vehicle roll angle (R_ANGLE) over time to determine whether the vehicle is being operated under normal driving usage or off-road driving usage, the off-road detection metric determining that the vehicle is operating in the off-road driving usage in a case where the vehicle roll angle crosses both an upper roll threshold indicative of positive roll angle and a lower roll threshold indicative of negative roll angle without the rollover discrimination metric entering a reset box;
   wherein the controller is also configured to execute a rollover discrimination metric configured to discriminate the occurrence of a rollover event in response to a vehicle roll rate (R_RATE) having a magnitude that exceeds one or more predetermined roll rate thresholds;
   wherein, in response to determining that the vehicle is being operated under normal driving usage, the controller is also configured to execute a normal rollover deployment algorithm to detect a vehicle rollover in response to the rollover discrimination metric discriminating the rollover event; and
   wherein, in response to determining that the vehicle is being operated under off-road driving usage, the controller is also configured to execute an off-road rollover deployment algorithm to detect a vehicle rollover in response to the rollover discrimination metric discriminating the rollover event.

2. The vehicle safety system recited in claim 1, wherein the off-road rollover deployment algorithm is configured to detect a vehicle rollover in response to:
   a normal safing function being ON and/or a specific rollover classification algorithm classifying the rollover event; and
   the rollover discrimination metric crossing an off-road rollover threshold.

3. The vehicle safety system recited in claim 1, wherein the off-road rollover deployment algorithm is configured to detect a vehicle rollover event in response to all of the following conditions being satisfied:
   the rollover discrimination metric crossing a rollover threshold that discriminates a specific type of rollover event;
   a rollover classification algorithm classifying a rollover event that matches the specific type of rollover discriminated by the rollover discrimination metric; and
   a roll acceleration (D_RATE) metric being maintained above a predetermined D_RATE threshold.

4. The vehicle safety system recited in claim 3, wherein the specific type of rollover event is one of a ramp rollover event, a ditch rollover event, a soft soil rollover event, a mid-soil rollover event, and a hard soil/curb rollover event.

5. The vehicle safety system recited in claim 3, wherein the rollover classification algorithm is configured to reset the classification in response to the rollover discrimination metric crossing a reset threshold or a vehicle roll angle (R_ANGLE) being equal to zero.

6. The vehicle safety system recited in claim 3, wherein the rollover classification algorithm is configured to classify the rollover event in response to:
   a lateral Y-axis acceleration (AMA_Y) metric that plots AMA_Y versus roll angle (R_ANGLE) crossing a predetermined threshold;
   a vertical Z-axis acceleration (AMA_Z) metric that plots AMA_Z versus roll angle (R_ANGLE) crossing a predetermined threshold;
   a roll rate (R_RATE) metric that plots R_RATE versus roll angle (R_ANGLE) crossing a predetermined threshold; and
   a roll acceleration (D_RATE) metric that plots D_RATE versus roll angle (R_ANGLE) crossing a predetermined threshold.

7. The vehicle safety system recited in claim 6, wherein the D_RATE metric comprises predetermined thresholds for identifying soft soil rollover events, mid-soil rollover events, and hard soil/curb rollover events.

8. The vehicle safety system recited in claim 1, wherein the normal rollover deployment algorithm is configured to detect a vehicle rollover in response to the rollover discrimination metric discriminating a rollover event and a specific rollover classification algorithm classifying the rollover event.

9. The vehicle safety system recited in claim 1, wherein the normal rollover deployment is configured to execute at least one of the following:
   determine the occurrence of a normal rollover event in response to the rollover discrimination metric crossing a normal threshold and a normal safing function being ON;
   determine the occurrence of a ramp rollover event in response to the rollover discrimination metric crossing a ramp threshold and a ramp classification algorithm being ON;
   determine the occurrence of a ditch rollover event in response to the rollover discrimination metric crossing a ditch threshold and a ditch classification algorithm being ON;
   determine the occurrence of a hard soil/curb rollover event in response to the rollover discrimination metric crossing a hard soil/curb threshold and a hard soil/curb classification algorithm being ON;
   determine the occurrence of a mid-soil rollover event in response to the rollover discrimination metric crossing a mid-soil threshold and a mid-soil classification algorithm being ON; and
   determine the occurrence of a soft soil rollover event in response to the rollover discrimination metric crossing a soft soil threshold and a soft soil classification algorithm being ON.

10. The vehicle safety system recited in claim 1, further comprising:
   an accelerometer for sensing vehicle lateral Y-axis acceleration and providing a signal indicative of sensed vehicle lateral Y-axis acceleration (AMA_Y);
   an accelerometer for sensing vehicle vertical Z-axis acceleration and providing a signal indicative of sensed vehicle vertical Z-axis acceleration (AMA_Z); and
   a roll sensor for sensing vehicle roll values and providing a signal indicative of sensed vehicle roll values,
   wherein the controller is configured to execute the off-road detection metric, rollover discrimination metric, normal rollover deployment algorithm, and off-road rollover deployment algorithm using the signals provided by the accelerometers, and the roll rate sensor.

11. The vehicle safety system recited in claim 1, wherein the actuatable restraints comprise at least one of seatbelt anchor pretensioners, seatbelt retractor pretensioners, curtain airbags, thorax airbags, and side airbags.

12. A method for controlling actuation of an actuatable restraint in response to a vehicle rollover event, comprising:
   detecting whether the vehicle is being driven on-road or being driven off-road by evaluating a vehicle roll angle (R_ANGLE) over time, wherein the vehicle is detected as being driven off-road in a case where the vehicle roll angle crosses both an upper roll threshold indicative of positive roll angle and a lower roll threshold indicative of negative roll angle without the rollover discrimination metric entering a reset box;
   determining whether the vehicle is undergoing a roll event that would warrant actuation of the actuatable restraint if the vehicle was being driven on-road; and
   actuating the actuatable restraint in response to determining that a roll acceleration (D_RATE) of the vehicle indicates that the roll event is continuing.

13. The method recited in claim 12, wherein determining whether the vehicle is undergoing a roll event comprises evaluating a rollover discrimination metric that plots the roll angle (R_ANGLE) versus roll rate (R_RATE) to determine whether the rollover discrimination metric crosses a rollover threshold.

14. The method recited in claim 13, wherein determining whether the vehicle is undergoing a roll event further comprises evaluating a rollover classification algorithm to determine the occurrence of a specific type of rollover event.

15. The method recited in claim 14, wherein evaluating the rollover classification algorithm comprises:
   evaluating a lateral Y-axis acceleration (AMA_Y) metric that plots AMA_Y versus roll angle (R_ANGLE) crossing a predetermined threshold;
   evaluating a vertical Z-axis acceleration (AMA_Z) metric that plots AMA_Z versus roll angle (R_ANGLE) crossing a predetermined threshold;
   evaluating a roll rate (R_RATE) metric that plots R_RATE versus roll angle (R_ANGLE) crossing a predetermined threshold; and
   evaluating a roll acceleration (D_RATE) metric that plots D_RATE versus roll angle (R_ANGLE) crossing a predetermined threshold.

16. The method recited in claim 14, wherein the specific type of rollover event is one of a ramp rollover event, a ditch rollover event, a soft soil rollover event, a mid-soil rollover event, and a hard soil/curb rollover event.

17. A vehicle safety system comprising:
   an actuatable restraint;
   a controller configured to control actuation of the actuatable restraint by:
   detecting whether the vehicle is being driven on-road or being driven off-road by evaluating a vehicle roll angle (R_ANGLE) over time, wherein the vehicle is detected as being driven off-road in a case where the vehicle roll angle crosses both an upper roll threshold indicative of positive roll angle and a lower roll threshold indicative of negative roll angle without the rollover discrimination metric entering a reset box;
   determining whether the vehicle is undergoing a roll event that would warrant actuation of the actuatable restraint if the vehicle was being driven on-road; and
   actuating the actuatable restraint in response to determining that a roll acceleration (D_RATE) of the vehicle indicates that the roll event is continuing.

* * * * *